United States Patent
Schloter et al.

(10) Patent No.: US 9,449,347 B2
(45) Date of Patent: Sep. 20, 2016

(54) METHOD AND APPARATUS FOR PROCESSING RECEIPTS

(75) Inventors: Philipp Schloter, San Francisco, CA (US); Matthias Jacob, Bad Tölz (DE)

(73) Assignee: Abukai, Inc., San Francisco, CA (US)

(*) Notice: Subject to any disclaimer, the term of this patent is extended or adjusted under 35 U.S.C. 154(b) by 239 days.

(21) Appl. No.: 13/349,536

(22) Filed: Jan. 12, 2012

(65) Prior Publication Data
US 2012/0185368 A1 Jul. 19, 2012

Related U.S. Application Data

(60) Provisional application No. 61/433,088, filed on Jan. 14, 2011.

(51) Int. Cl.
*G06Q 40/00* (2012.01)

(52) U.S. Cl.
CPC .............. *G06Q 40/12* (2013.12); *G06Q 40/00* (2013.01)

(58) Field of Classification Search
CPC ............................. G06Q 40/00; G06Q 40/12
See application file for complete search history.

(56) References Cited

U.S. PATENT DOCUMENTS

| | | | |
|---|---|---|---|
| 7,069,240 B2* | 6/2006 | Spero et al. | 705/30 |
| 7,424,974 B2* | 9/2008 | Hull et al. | 235/385 |
| 8,180,682 B2* | 5/2012 | Narayanaswami et al. | 705/26.1 |
| 8,359,239 B1* | 1/2013 | Cook | G06Q 30/04 705/16 |
| 8,392,957 B2* | 3/2013 | Holt et al. | 725/105 |
| 9,009,070 B2* | 4/2015 | Young | G06Q 40/02 705/16 |
| 2004/0088181 A1* | 5/2004 | Romanin et al. | 705/1 |
| 2004/0098664 A1* | 5/2004 | Adelman et al. | 715/500 |
| 2005/0222944 A1* | 10/2005 | Dodson et al. | 705/39 |
| 2007/0067373 A1* | 3/2007 | Higgins | G06F 11/3013 |
| 2010/0057565 A1* | 3/2010 | Au-Yeung et al. | 705/14.53 |
| 2010/0241990 A1* | 9/2010 | Gabriel et al. | 715/810 |
| 2011/0064263 A1* | 3/2011 | de Haan et al. | 382/100 |

OTHER PUBLICATIONS

Leedom, "Banking on the Smartphone", Mitek Systems, Dec. 1, 2009 [retrieved on May 6, 2012 http://www.californiastocks.com/root/Portals/0/MITK/Initiation12012009.pdf ] pp. 1-30.
PCT/US2012/021376, International Search Report and Written Opinion; dtd May 16, 2012. pp. 1-7.

* cited by examiner

*Primary Examiner* — Asfand Sheikh
(74) *Attorney, Agent, or Firm* — Lowenstein Sandler LLP

(57) ABSTRACT

Systems and methods of processing expense receipts are provided. Images of expense receipts are received from a user device. The images are processed to obtain receipt information. A list of user expenses is generated based on the receipt information.

24 Claims, 14 Drawing Sheets

METHOD AND APPARATUS FOR PROCESSING RECEIPTS

CROSS-REFERENCE TO RELATED APPLICATIONS

This application claims the benefit of U.S. Provisional Application No. 61/433,088, titled "A METHOD AND APPARATUS FOR PROCESSING EXPENSE RECEIPTS," filed on Jan. 14, 2011, the contents of which are hereby incorporated by reference herein.

TECHNICAL FIELD

Embodiments of the present invention relate to data processing, and more specifically, to processing data for receipts.

BACKGROUND

Many companies and/or businesses will often have an employee pay for their expenses first and will reimburse the employee for their expenses later. Expense reports are generally used to track the time, date, amount, location, and/or other information associated with these expenses. Employees often spend a significant amount of time creating expense reports. Employees often need to collect physical receipts and ensure they do not lose them prior to completion of their expense report. They may manually enter a range of information from the receipt into a computer system, spreadsheet, device application, or online portal to complete the report. They may also categorize the receipts manually (e.g., receipt for dinner, etc.). In many cases the employee may also convert the currencies on the receipts to local currencies on the expense report. In addition, the employee may also need to submit physical copies of the receipts with the expense report. Even after all of the employee's work, a third person (e.g. in finance or accounting) may double-check whether the information on receipts has been entered correctly by the employees and whether the proper category for each expense was elected. In addition, many companies, businesses, or even units/divisions of a company may have a variety of different systems, formats or templates to collect the expense report information and often develop their own formats. Different companies or divisions within the companies may also categorize costs differently (e.g., one division may aggregate all meal costs while another division may differentiate between lunch and dinner). Thus, tracking expenses and generating expense reports is often a costly and time-consuming process.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Systems and methods for processing expense receipts are described. In one embodiment, images of expense receipts may be received from a user device. The images are processed to obtain receipt data from the expense receipts (e.g., time, date, location, amount, etc.). A list of user expenses is automatically generated and may be included in an expense report and/or expense feed (e.g., a Comma Separated Value (CSV) file, a Really Simple Syndication (RSS) feed, and/or an Open Financial Exchange (OFX) file).

In one embodiment, contextual data (such as date, location, currency, phone numbers, postal codes, lists of vendors, airport codes, area codes, phone numbers, postal codes, past receipts, state codes/names, country names, dates, month names, weekday names, frequently used terms, and/or anti-terms, e.g., terms which indicate that a portion of a receipt should not be analyzed or OCRed) in addition to OCR and/or other image recognition may be used to process expense receipts. Another embodiment may use contextual data for switching between customizations of expense reports. Still other embodiments may customize expense reports using user data, account data, and contextual data. Yet other embodiments may process expense receipts and feed the output into other systems (e.g., via an expense feed). Still other embodiments may provide payment for receipts upon receiving an image of the receipt. Other embodiments may also provide information or statistics about the expense reports to a third person such as an employee's manager. Further embodiments may allow for advertisements and/or product recommendations to be included in expense reports, based on past receipts, a user's account/profile, and other information.

Figure 1:
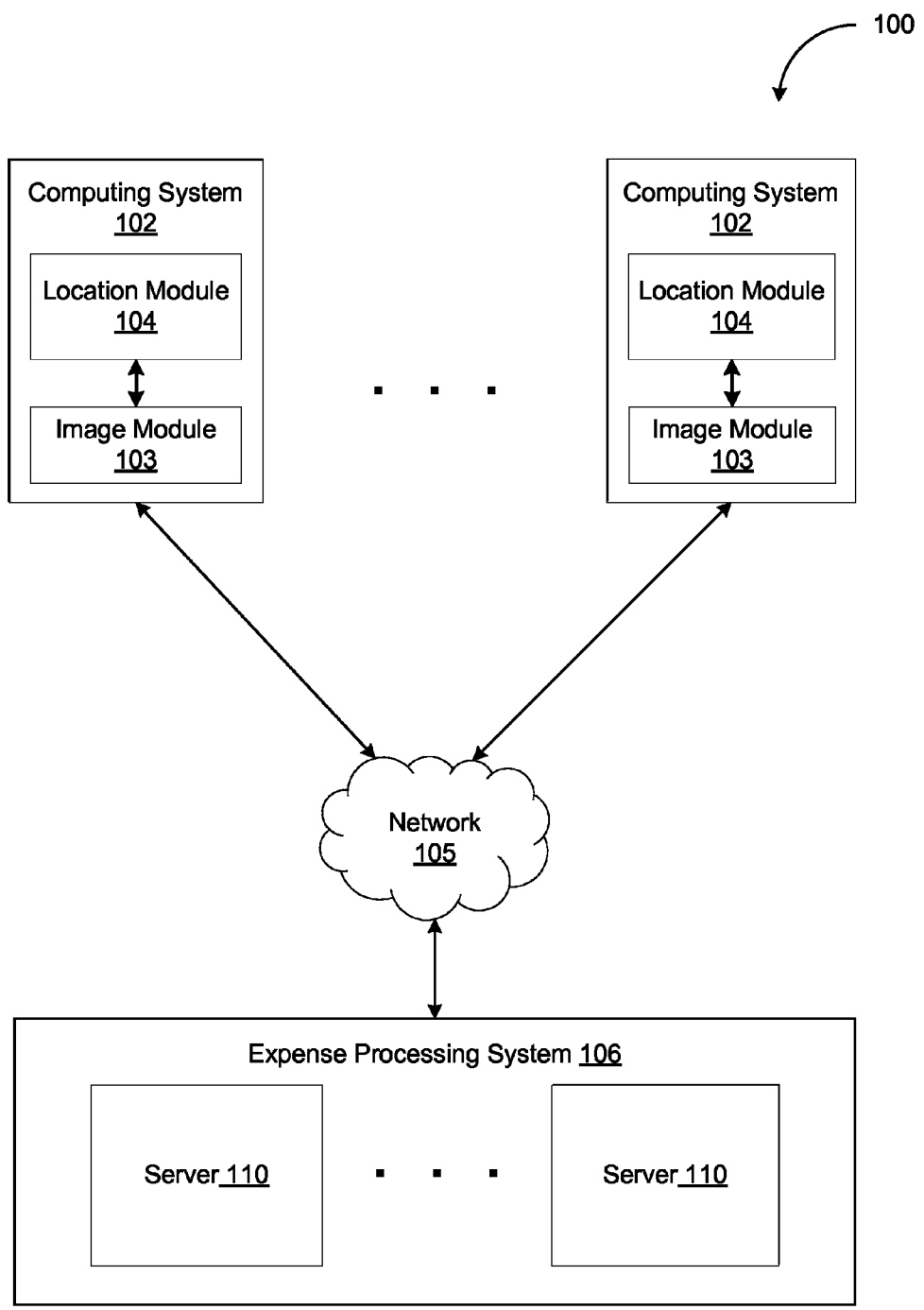
FIG. 1 is a block diagram of an exemplary system architecture in which embodiments of the invention may operate.

FIG. 1 illustrates an exemplary system architecture 100 in which embodiments of the present invention may operate. System 100 includes computing systems 102 in communication with (e.g., coupled to) an expense processing system 106 over a network 105. The expense processing system 106 may include one or more servers 110. Each computing system 102 includes an image module 103 and a location module 104. In on embodiment, the network 105 may be a private network (e.g., a local area network (LAN), a wide area network (WAN), intranet, etc.), a corporate network (e.g., a private network for an organization such as a corporation), a broadcast network, a public network (e.g., the Internet), a wired network (e.g., Ethernet network), a wireless network (e.g., an 802.11 network) and/or a cellular network (e.g., a Long Term Evolution (LTE) network).

The servers 110 may include computing devices that have a wide range of processing capabilities such a personal computer (PC), a server computer, a personal digital assistant (PDA), a smartphone, a laptop computer, a netbook computer, a tablet device, and/or any machine capable of executing a set of instructions (sequential or otherwise) that specify actions to be taken by that machine. The computing systems 102 represent various client devices that have a wide range of processing capabilities (e.g., a personal computer (PC), a personal digital assistant (PDA), a smart phone, a laptop computer, a netbook computer, a tablet device, a cellular phone, etc.).

Each computing system 102 includes an image module 103 and a location module 104. The image module 103 may be software and/or hardware which are capable of obtaining images of objects, such as an image of an expense receipt from a vendor. For example, the computing system 102 may be a smartphone and the image module 103 may be a digital camera and/or the software for the digital camera. The image module 103 may include, but is not limited to, a camera, a camcorder, a scanner, any device capable of capturing images, and/or software associated with such devices. The location module 104 may be software and/or hardware which are capable of obtaining the location of the computing system 102. For example, the location module 104 may be a Global Positioning System (GPS) device and/or the software for the GPS device. The location module may include, but is not limited to, a GPS device, an Assisted GPS (A-GPS) device, a Global Navigation Satellite System (GLONASS) device, a device capable of communicating with cellular communication towers to obtain location information for the cellular communication towers, and/or any device capable of obtaining the location of the computing system 102, and/or software associated with such devices.

Embodiments of the invention process data associated with user expenses (e.g., images of expense receipts from the purchase of items and/or the use of services) to generate one or more expense reports. In one embodiment, the expense processing system 106 may generate a feed of expenses (e.g., data associated with the expenses or an expense feed) which may be provided and/or imported into other reporting systems (e.g., other types of expense processing systems). In some embodiments, processing of expense receipts, generation of expense reports, and/or generation of expense feeds are performed automatically (e.g., without user interaction).

Although the system architecture 100 includes multiple entities such as one or more computing system 102 and servers 110, other embodiments of the invention may use different system architectures. For example, the functionality discussed herein may be completely implemented on a computing device 102 or a server 110 in a client-server environment. In other examples, the functionality discussed herein may be implemented on one or more nodes in a peer-to-peer environment (e.g., the expense processing system 106 includes one or more nodes), a cloud computing environment (e.g., the expense processing system 106 is located within a "cloud"), a grid computing environment (e.g., the expense processing system 106 is located within a distributed computing system), etc.

In one embodiment, the computing system 102 may obtain receipt data associated with one or more expenses (e.g., an image of an expense receipt). The computing system 102 may obtain the receipt data using the image module 103 (e.g., using a digital camera). In another embodiment, the computing system 102 may also obtain location data (e.g., data associated with the location of the computing system 102). The location data may be associated with the receipt data. For example, the location data may indicate the geographical location at which the receipt data was obtained (e.g., GPS coordinates to indicate the location at which the image of an expense receipt was obtained). The computing system 102 may transmit the receipt data and/or the location data to the expense processing system 106 via the network 105. As discussed above, the network 105 may be any type of network, such as a wireless, a wired network, a public network (e.g., the internet) and/or a cellular network (e.g., an LTE network). The computing system 102 may transmit the receipt data using a variety of communication protocols including, but not limited to HyperText Transfer Protocol (HTTP), HTTP Secure (HTTPS), email protocols (e.g., Post Office Protocol 3 (POP3) or Internet Message Access Protocol (IMAP), File Transfer Protocol (FTP), TCP/IP, UDP, 802.11 protocols, LTE protocols, and/or other electronic communication protocols.

In one embodiment, the expense processing system 106 may process the receipt data and/or the location data received from the computing system 102. The expense processing system 106 may process receipts and/or receipt data for expenses such as phone bills, hotel bills, airline tickets, taxi receipts, restaurant bills, dry cleaning bills, or any expense for products and/or services. The receipt data may also include notes related to the expenses (e.g., a note indicating how many miles on a taxi ride were work related). Based on the receipt data and/or the location data, the processing system 106 may generate one or more expense reports (e.g., a list of expenses) and/or one or more expense feeds (e.g., a list of the expenses which may be provided to other systems).

In one embodiment, an expense (listed in a report or provided in an expense feed) can include a description of the expense, notes or comments associated with the expense, a category code, an amount, a tax code, a tax percentage (e.g., an 8.25% tax rate), a tax amount, an amount in a local currency, the city, the state, the country, the longitude, the latitude or other form of the location of the expense, the vendor for the expense, exchange rate associated with the expense, the amount in a home currency, the amount in the local currency, the type of currency, people or guests that participated in the expense (e.g. customers hosted), the type of expense (e.g. meal or transportation), or any combination of the above. In some embodiments, an expense can include several line items including but not limited to different items on grocery bill, items of a hotel bill such as for example room rate, entertainment, meals, parking, phone, internet or taxes. This is sometimes stored in the description of the expense but not exclusively.

In one embodiment, an expense report may also include additional information such as an employee name, a division the employee belongs to, a region, a name or email of the manager of the employee, a company name, a project code, a customer code, a cost center, or similar indicators, a home currency, a purpose of a trip or expense, destinations, start time/date, end time/date. In another embodiment, the expense report may also include images of the receipts for the associated expenses. The expense report may include an identification tag to reference an expense back to the image of the expense receipt.

In one embodiment, an expense feed may include a continuous series of expense data that can be electronically submitted to other systems for further processing. For example, an expense feed may include one or more expenses obtained based on receipt data, which may be converted to a format which is usable by another expense processing system (e.g., an existing or commercially available expense processing system), posted via an API or other interface to another system (which may be in the same location as the expense processing system or in a remote location, such as within the cloud or Internet), and/or downloaded from a central location by another system.

Embodiments of the invention reduce the burden on a user to keep physical receipts and also reduce the amount of manual labor required to enter expense information in order to generate an expense report. Embodiments of the invention may also reduce the need for double-checking expense reports, and may increase compliance with the processes, formats and procedures for expense reports. In addition, embodiments of the invention may enable users to tailor their expense reports and/or expense feeds to a company's existing formats, templates, and/or existing systems. Furthermore, embodiments of the invention may also perform credit card reconciliation to match credit card bills with the expense receipts which were processed.

Figure 2A:
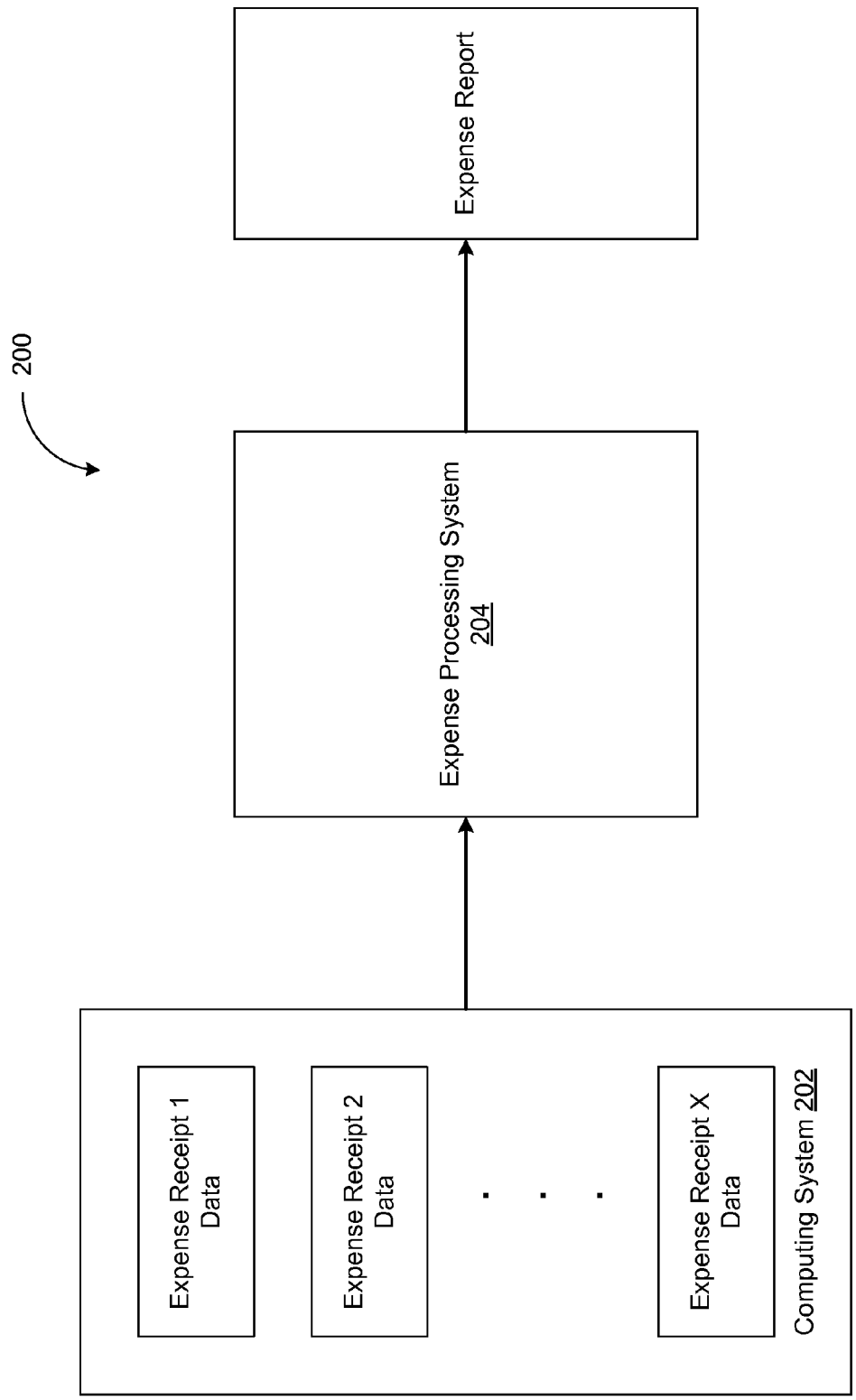
FIG. 2A is a block diagram illustrating a procedure for processing receipts, according to one embodiment.

FIG. 2A is a block diagram illustrating a system for processing receipts, according to one embodiment. The system 200 includes a computing system 202, an expense processing system 204, and an expense report. More or less components may be included in the system 200 without loss of generality.

The computing system 202 includes data associated with multiple expense receipts (e.g., Expense Receipt 1 Data through Expense Receipt X Data). As discussed above, the computing system 202 may obtain this data using a location module (e.g., a GPS device) and/or an imaging module (e.g., a digital camera) coupled to the computing system 202. For example, the computing system 202 may obtain an image of an expense receipt and a geographical location where the image of the expense receipt was obtained.

The computing system 202 may provide the data associated with the expense receipts to an expense processing system 204. The expense processing system 204 may analyze the data associated with the expense receipts and may generate an expense report, based on data. The generation of the expense report is discussed in more detail below in conjunction with FIGS. 2B through 6.

Figure 2B:
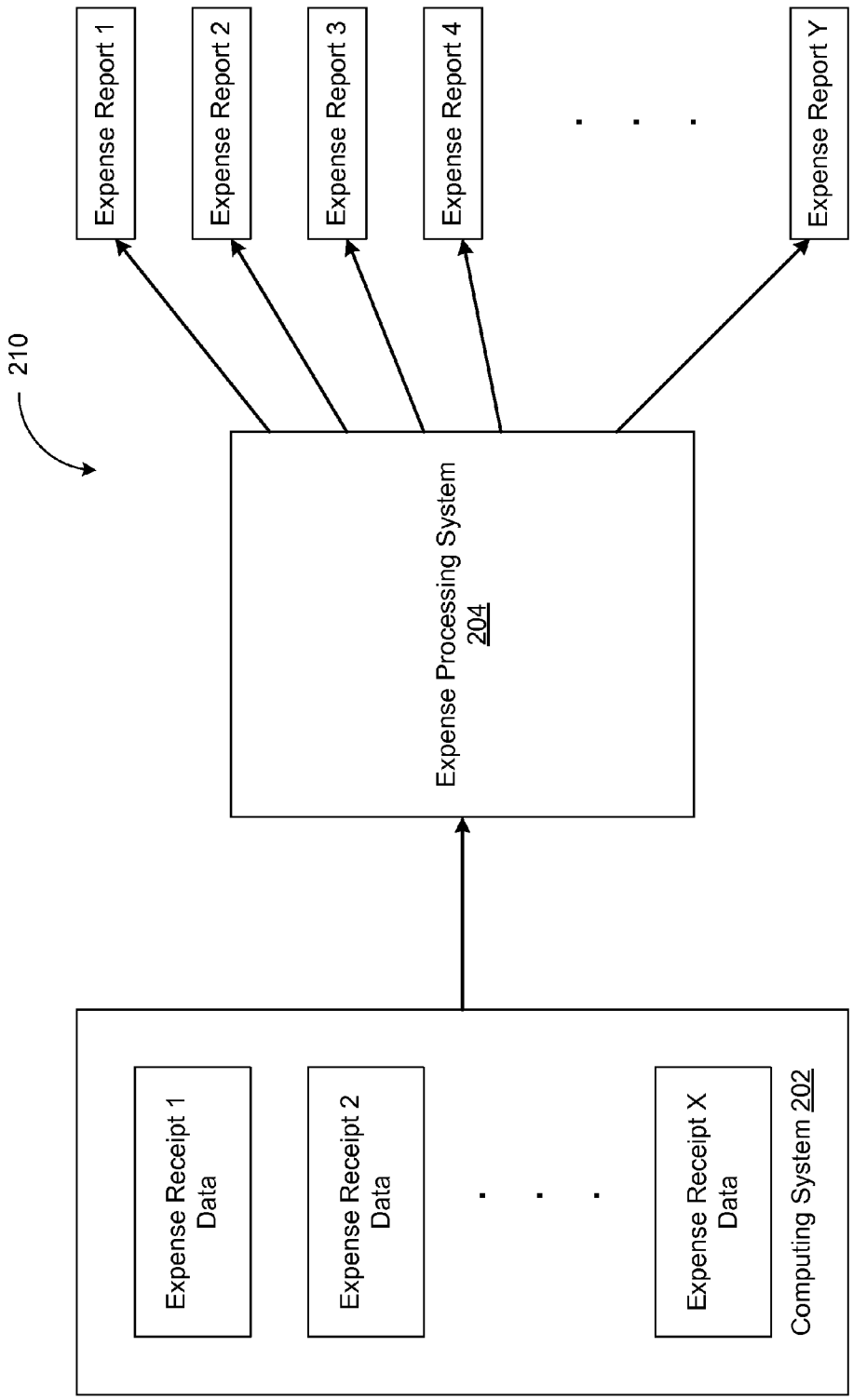
FIG. 2B is a block diagram illustrating a procedure for processing receipts, according to another embodiment.

FIG. 2B is a block diagram illustrating a system for processing receipts, according to another embodiment. System 210 is similar to system 200 of FIG. 2A. However, in FIG. 2B, the expense processing system 204 generates multiple expense reports (e.g., Expense Report 1 through Expense Report Y), based on the data associated with the multiple receipts. For example, an Expense Report 1 may be a summary of all expenses for a given unit, group, and/or company. In another example, Expense Report 1 through Expense Report Y may each be expense reports for different project codes, job codes, customers, projects and/or similar activity-based categorizations. In another example, Expense Report 1 through Expense Report Y may each be an expense report for a different business trip undertaken by an employee of a company.

Figure 2C:
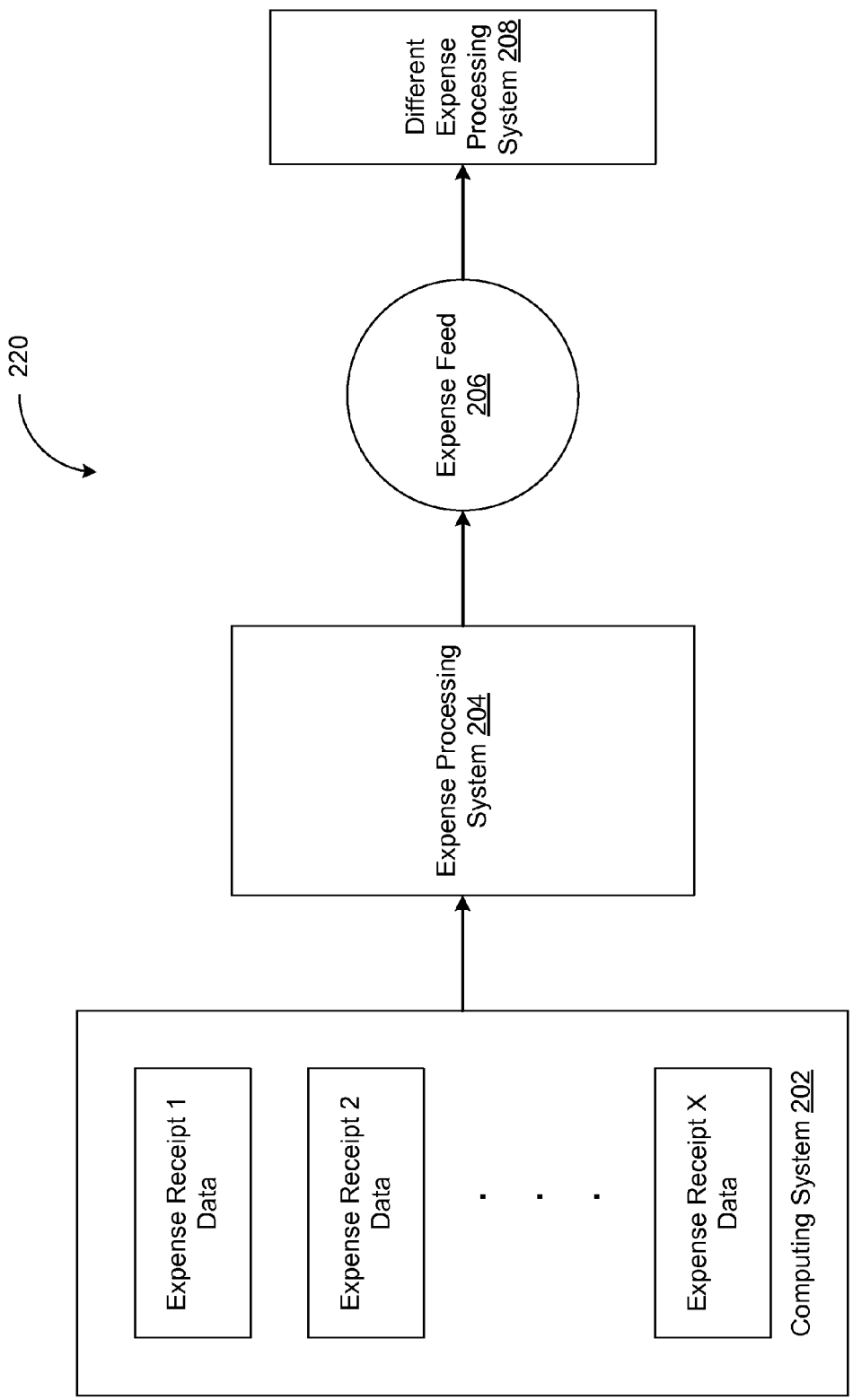
FIG. 2C is a block diagram illustrating a procedure for processing receipts, according to a further embodiment.

FIG. 2C is a block diagram illustrating a system 220 for processing receipts, according to a further embodiment. System 220 is similar to system 200. However, in FIG. 2C, the expense processing system 204 generates an expense feed 206, instead of generating one or more expense reports. As discussed above, expense feed 206 may be a series of expense data specifying expense parameters and additional information pertaining to the expense parameters. For example, the expense feed 206 may include the dates, times, amounts, locations, reasons, and/or other information for one or more expenses. In another example, the expense feed 206 may include the attributes for each expense on the report as well as general attributes that make up an expense report as described above. In one embodiment, the expense feed 206 may be provided to a different expense processing system 208 over a network (e.g., a local network or a public network such as the Internet). The different expense processing system 208 may import the expenses received via the expense feed 206 into an accounting or other expense management system. In another embodiment, the expense feed 206 may provide the expenses to the different expense processing system 208 using formats such as the Extensible Markup Language (XML), the Open Financial Exchange (OFX) format, and/or any other format suitable for providing information related to expenses. In one embodiment, the expense feed 206 may be delivered (e.g., transmitted) to the different expense processing system 208 using protocols including, but not limited to, HTTPS, Secure Socket Layer (SSL), HTTP, FTP, and/or any other communication protocol. In a further embodiment (not shown in the figures), the expense processing system 204 may generate both expense reports and the expense feed 206.

Figure 3A:
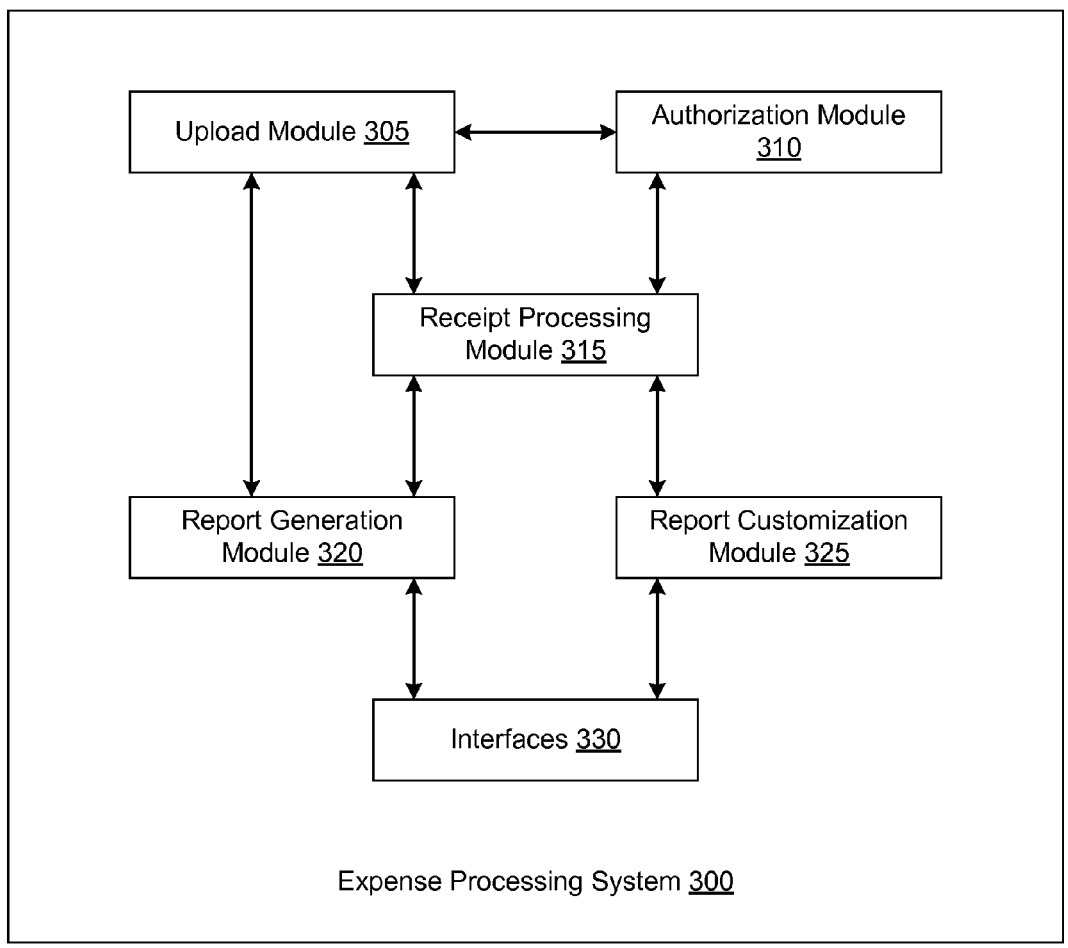
FIG. 3A is a block diagram illustrating an expense processing system, according to one embodiment.

FIG. 3A is a block diagram illustrating an expense processing system 300, according to one embodiment. The expense processing system 300 may include an upload module 305, an authorization module 310, a receipt processing module 315, a report generation module 320, a report customization module 325, and one or more interfaces 330. In one embodiment, the modules of the expense processing system 300 may be located on one or more of the servers 110 shown in FIG. 1. More or less components may be included in the expense processing system 300 without loss of generality.

As discussed above, a computing system (e.g., computing system 102), which may have the capability to obtain and/or store images of receipts, allows a user to collect receipt data (e.g., images and/or data associated with expense receipts for food, lodging, transportation, etc.) and submit the receipt for processing to the expense processing system 300. The user may also submit contextual information associated with the expense receipts (e.g., date, location, currency, phone numbers, postal codes, airport codes, etc.). The submission may be performed using the same device (e.g., a smartphone, a netbook, etc.) used for taking the images or may be performed using a different device (e.g., a personal computer). The receipt data (e.g., images of the expense receipts) and the contextual data associated with the receipt data may be referred to as expense data. In one embodiment, the expense data may include receipt data and contextual data for multiple expense receipts. The expense processing system 300 may receive expense data from one or more computing devices and may generate one or more expense reports and/or expense feeds, based on the expense data.

The authorization module 310 may authorize a user of the expense processing system 300. The authorization module 310 may help prevent unauthorized users from submitting expense receipts for processing and/or generating expense reports. A user may be authorized using a variety of different methods and/or data. For example, the user may provide a user name, password, and/or email address. In another example, the user may provide an authentication ticket (e.g., a Single Sign On ticket). In yet another example, the user may authenticated by analyzing identification information of the computing system used by the user (e.g., a phone number for a smartphone or an International Mobile Equipment Identity (IMEI) number for a smartphone). In one embodiment, different combinations of data and/or methods may be used. For example, the email address of the user and the IMEI of a computing device may be used to authenticate the user.

The upload module 305 may process and/or manage the expense receipts (e.g., expense data) received from one or more computing systems. The upload module 305 may receive expense data from computing systems using protocols such as HTTP, HTTPS, SSL, or FTP. In one embodiment, the expense data may include one or more of: 1) receipt images, 2) receipt-related context information, 3) report-related context information, 4) user-related context information, and 5) delivery-related context information.

In one embodiment, the receipt images may be in an image format such as a Joint Picture Experts Group (JPEG) format, a bitmap (BMP) format, a graphics interchange format (GIF), a Portable Network Graphics (PNG) format, etc. In another embodiment, the contextual information (e.g., the receipt-related context information, report-related context information, user-related context information, and delivery-related context information), which may be provided per receipt image, may include information that is not part of the receipt itself such as the longitude, latitude and country where the receipt image was created (e.g., geographical location where the picture was taken), additional notes from the user (e.g., a note describing the purpose of the expense), an indicator as to whether this is an out-of-pocket charge (i.e. paid by the user), etc. In a further embodiment, the report-related context (which may be provided per receipt image) may include information such as the home currency of the user, the format for the expense report, etc. The upload module 305 may provide the expense data (e.g., receipt data such as an image of the receipt, and the contextual data for the receipts) to the receipt processing module 315 for further processing. Examples of receipt-related context information include, but are not limited to the time when an image of a receipt was obtained, an identification of a cellular communication tower in communication with the computing system when the image of the receipt was obtained, additional notes, sensor information captured before, after or when the image of the receipt was obtained (e.g., temperature, altitude, etc.). Examples of report-related context information include, but are not limited to, an activity, client, home currency to which all other currencies of the report get converted, project, matter code, cost center, customer description, name, identifier and/or number that is associated with one or more expenses in an expense report. Examples of user-related context information include, but are not limited to, the preferred device language, region, time format, first name, last name, company name, title, manager, manager's email, banking information, address information, location of employment, employee organizational unit, company name, etc. For example the first name and/or last name of the user submitting the receipt may be ignored when analyzing the text within the receipt and determining the location or vendor in a particular receipt, because the user's name is mostly likely not the vendor's name or location. Examples of delivery-related context information include, but are not limited to, any expense report format settings, the selection of the individual files in the delivery, potential fees required to add on top of line items for all reports, any information about a third-party system where the results will be posted to.

The receipt processing module 315 may perform a variety of operations on the expense data received from the upload module 305. In one embodiment, the receipt processing module 315 may optionally perform image processing operations to enhance the quality of the images of the receipt. In another embodiment, the receipt processing module 315 may also perform Object Character Recognition (OCR) on the text within the receipt, in order to obtain receipt information to use in an expense report and/or an expense feed. For example, the receipt processing module 315 may identify the amount, business name, the item purchased, the service rendered, the city, the state, and/or the country of the expense buy analyzing the text of the receipt (e.g., may identify the receipt information in the receipt). The receipt processing module 315 may also identify to Value-added tax (VAT) amount on the receipt with or without the help of a country-based VAT database that includes rules for the different VAT rates for different countries.

In one embodiment, the receipt processing module 315 may use grammars and algorithms to interpret the receipt data (e.g., the OCR text from the image of the receipt) in conjunction with the contextual data associated with the receipt data. For example, a Zone Improvement Plan (ZIP) code or postal code on the receipt can identify the city, state, and country of the expense. In another example, the area code or full phone number may also be used to identify city, state and country of the expense. The full phone number may also be used to determine the name of the vendor and possibly the type of expense. The name of cities, state codes or state names can also be used to identify the location of the expense and/or vendor. Airport codes or airport names can also assist in identifying the location of the expense and/or vendor. In a further example, the contextual data (e.g., the location where the image of the receipt was taken) may also be used to determine the location of the expense. Based on the data of the receipt (e.g., the text of the receipt with a restaurant name) and the contextual data (e.g., the location where the receipt image was obtained), the receipt processing module 315 may query one or more databases to obtain information about the business which provided the goods and/or services associated with the receipt. In another example, the time identified in the receipt data may be used to determine whether the meal expense on the receipt is lunch, dinner or breakfast.

In one embodiment, the interpreted receipt data (e.g., receipt information obtained by performing OCR on a receipt) may override the contextual data associated with the receipt. For example, an expense receipt may be from a dinner at a restaurant. A user may take a picture of the receipt back at a hotel room. The contextual data (e.g., the location where the image of the receipt was taken) would contain the geographic location of the hotel room. However, the text of the receipt may include the address of the restaurant. The address of the restaurant obtained from the receipt may override the contextual data which includes the location where the image of the receipt was taken (e.g., the hotel room). In another example, a date in the receipt can override the date when the image of the receipt was taken (e.g., the contextual data associated with the receipt).

In one embodiment, the receipt processing module 315 may optionally allow a human operator to correct and/or add information associated with one or more expense receipts and may also allow the human operator to release the expense receipts for further processing. It should be understood that in some embodiments, the receipt processing module 315 may operate without the interaction of a human operator.

The report generation module 320 uses the expense data (e.g., the receipt data and the contextual data) and the report-related context information to generate the report. For example, the report generation module 320 may convert all receipt amounts to a pre-defined currency (e.g., convert Euros to U.S. Dollars) or may assign different expense receipts to different projects. After generating the report the report generation module 320 may provide the report to the report customization module 325.

The report customization module 325 may allow for customization (e.g., selection of what type of data is presented and how the data is presented) of expense reports. The expense report may be customized based on a report template. For example, an entry in a report (e.g., an entry for a particular expense) may have a separate column for the tax and a separate column for the pre-tax amount, or the total amount may be combined into one column, based on the report template. The report template can be configured using the one or more interfaces 330.

One or more interfaces 330 may be used to configure, manage, maintain, and/or access the expense processing system 300. For example, the interface 330 may be used by a human operator to check an expense report before submitting the expense report for approval. The interfaces 330 are discussed in more detail below in conjunction with FIG. 4.

Figure 3B:
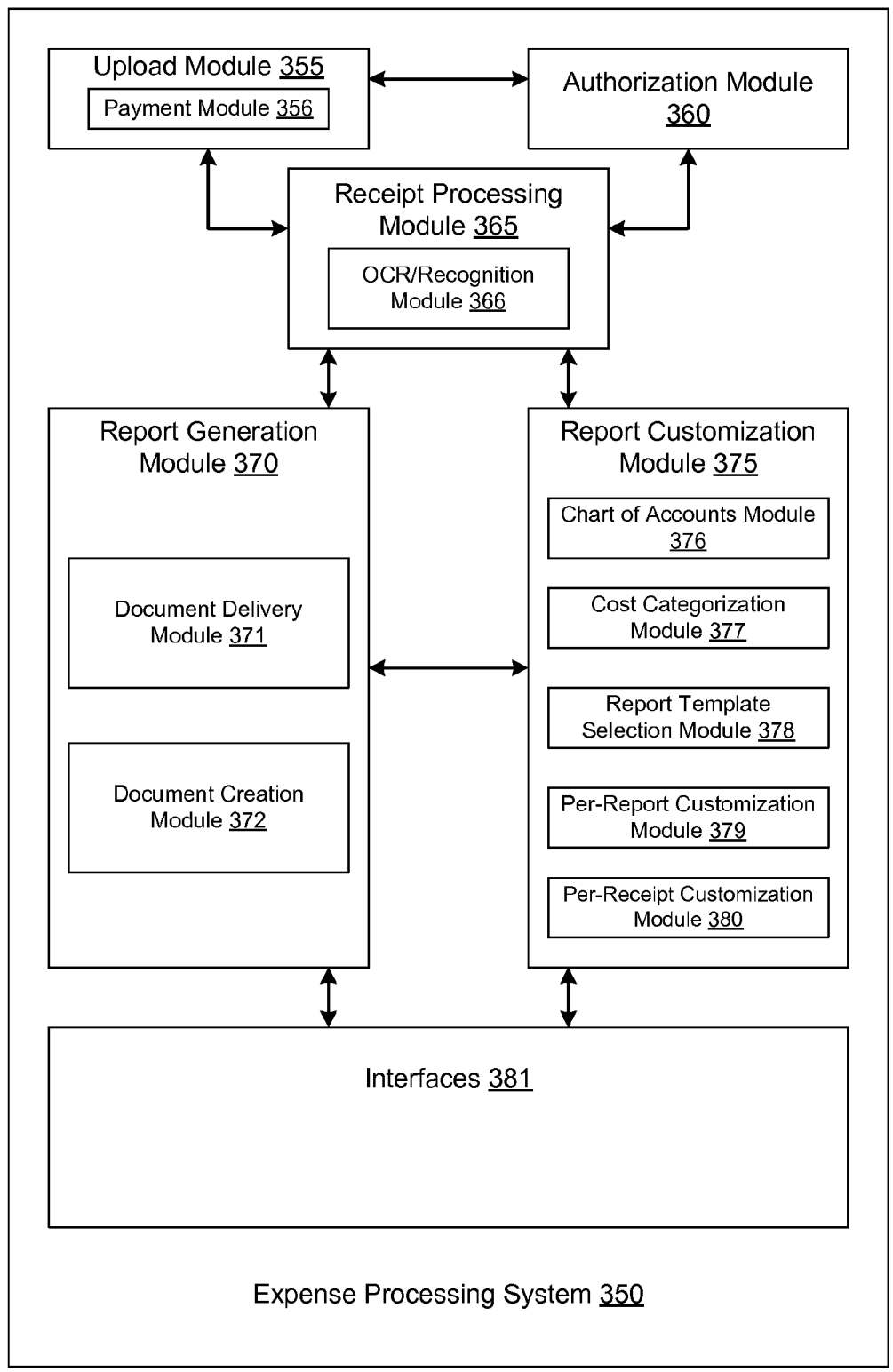
FIG. 3B is a block diagram illustrating an expense processing system, according to another embodiment.

FIG. 3B is a block diagram illustrating an expense processing system 350, according to one embodiment. The expense processing system 350 may include an upload module 355, an authorization module 360, a receipt processing module 365, a report generation module 370, a report customization module 375, and one or more interfaces 381. In one embodiment, the modules of the expense processing system 350 may be located on one or more of the servers 110 shown in FIG. 1. More or less components may be included in the expense processing system 300 without loss of generality.

As discussed above, the authorization module 360 may help prevent unauthorized users from submitting expense receipts for processing. The user may be authenticated using one or more of an email address of the user, a username, a password, an IMEI number for the computing device, a phone number for the computing device, etc. If the user is authenticated, the expense processing system 350 may allow a user to submit expense receipts (e.g., submit expense data including receipt data and contextual data). In one embodiment, the authorization module 360 may use one or more databases (discussed below in more detail in conjunction with FIG. 4 to determine whether a user will be charged for usage of the expense processing system 350. The usage of the expense processing system 350 may be tracked in a database (e.g., a transaction database).

In one embodiment, the expense processing system 350 may later generate an invoice (e.g., generate an invoice using a script) to bill a user for usage of the expense processing system 350 (e.g., for submitting expense data and for generating expense reports). A user may be charged for each expense receipt (e.g., each set of expense data) submitted and/or each expense report generated. These invoices may be stored in an invoice database for later access and/or may be sent to the user. In one embodiment, an identifier (e.g., a stock-keeping unit (SKU) may be used to define the access a user has to the expense processing system. For example, the user may have access to a corporate account where the user's company gets charged for the usage of the expense processing system, a trial account where nobody gets charged, or an individual account where the user or another individual gets charged. The SKU may also be used to provide additional features on a device, portal and/or processing. For example, certain user interface components (such as a switch, button or menu) to differentiate cash from credit card expenses, or a selection capability to assign sets of receipts or single receipts to a certain project, client, matter code, customer, cost center or similar activity, may be provided based on the SKU. In another example, a history of previous expense reports could be displayed or turned off depending on the SKU, if required for security reasons. In one embodiment, a user's account may also provide for a certain number of expense reports and/or receipt submissions that may be processed without generating charges to the account (e.g., a user may generate up to 5 expense reports a month without being charged or submitted 10 expense receipts a week without getting charged). Once the certain number is reached on an account, an additional charge can be triggered, the account can be shut down, the customer can be requested to renew the account, pay for the charges, and/or some other action may be performed before more expense reports can be generated.

In another embodiment, the authorization module 360 can also generate one or more security codes (e.g., passwords) that the user needs to enter on their computing system before being able to use expense processing system 350 and/or to before being able to access their account. These security codes may be static or they may be dynamic and may change each time the user accesses the expense processing system 350. For example, a new security code may be transmitted to a user's email and/or phone number each time the user accesses the expense processing system 350.

As discussed above, the upload module 355 may process and/or manage the expense data received from one or more computing systems. For example, the upload module 355 may receive receipt data (e.g., an image of the receipt in a variety of image formats such as JPEG, GIF, etc.) and context data for the receipt data (e.g., receipt-related context information, report-related context information, etc). The upload module 355 includes a payment module 356. In one embodiment, the upload module 355 may provide the expense data to the receipt processing module 360 and may initiate processing of the expense data (e.g., generation of expense reports). In one embodiment, the upload module 355 may also determine whether expense data submitted by a user should be processed (e.g., whether the user's account allows for processing of the expense data or requires payment before the expense data can be processed) and may also determine whether an expense report should be generated. The upload module 355 may check on a user's account and determine whether the expense data should be processed and/or whether an expense report should be generated, using the payment module 356.

In one embodiment, the payment module 356 may be combined and/or integrated with the upload module 355. The payment module 356 may allow the expense processing system 350 to check whether a user is allowed to submit expense data and/or allowed to request generation of expense reports (e.g., whether the user's account has sufficient funds and/or access to submit expense data and/or generate expense reports). In one embodiment, based on the one or more databases (e.g., a user database, an account database, an invoice database, and/or a transaction database), the payment module 356 may charge an account (e.g., a user's account or a corporate account) for submitting expense data and/or for generating expense reports. The payment module 356 may also use different payment methods (e.g., a payment made via an application store payment, a credit card transaction, an automated clearing house (ACH) or wire transfer, a debit card transaction, a payment made via a payment service, etc.), to allow a user to pay for charges on their account. In another embodiment, the payment module 356 may provide the invoice for the payment to the user and/or to the company associated with the account (e.g., via email, via facsimile, via physical mail, via text message, etc.). In one embodiment, the payment module 356 may allow for processing of expense data and/or generation of expense reports after a payment has been processed (e.g., payment is verified or cleared) by the payment module 356.

In one embodiment, the receipt processing module 365 may analyze and/or process the expense data (e.g., the receipt data, such as an image of the receipt, and the contextual data, such as a GPS location) to obtain receipt information for an expense receipt, including, but not limited to, the amount of the expense (e.g., total amount, tax, tip, etc.) the location of the expense (e.g., country, street address, etc.), the items purchased or services rendered, the date of the expense, a phone number, etc. This receipt information may be provided to other modules (e.g., report generation module 370) in the expense processing system 350 in order to generate expense reports.

In one embodiment, the receipt processing module 365 may analyze expense data to determine what type of expense an expense receipt represents. For example, the receipt processing module 365 may determine that an expense receipt is a "meal" type of receipt (e.g., an expense receipt for food consumed by a user), or that an expense receipt is a "lodging" type of receipt (e.g., an expense receipt for a hotel), or that an expense receipt is a "transportation" type of receipt (e.g., an expense receipt for a taxi ride). The processing module 365 may user other modules, such as a cost categorization module 378 (discussed in more detail below) to determine the type of expense the receipt represents.

As discussed above, the location of the expense (e.g., contextual data) may be used by the receipt processing module 365 to determine the type of the expense. For example, if the receipt data was obtained in a restaurant, based on the location, then the receipt is likely to be an expense receipt for food from the restaurant. In one embodiment, the receipt processing module 365 may obtain GPS coordinates of where the receipt image (e.g., the receipt data) was taken and/or the cell tower information, in the case where the computing system is a mobile device with cellular connectivity. The receipt processing module 365 may obtain the location (e.g., city, state, country, street address, etc) from a location database which may correlate the GPS coordinates with the location (e.g., the street address). In another embodiment, the receipt processing module 365 may also use a database of cell tower locations and/or a database of cell tower country codes in case GPS data is not available (e.g., the computing system does not have a GPS receiver). In a further embodiment, a zip/postal code database may be used to identify a country or any location data and/or possible zip codes in the country that was identified. In another embodiment, a phone area code database may be used to identify location data. In one embodiment receipt processing module 365 may use an OCR/Recognition module 366 to analyze the image data of the receipt (e.g., to obtain a phone number or a zip code from the text of the receipt).

In one embodiment, the OCR/Recognition module 366 may use an OCR engine, a hand-writing recognition engine, and/or other image recognition engines on the receipt image (e.g., the receipt data) to obtain information from the receipt data. The OCR/Recognition module 366 may also apply grammars to process the information obtained from the receipt data (e.g., text, numbers, addresses, amounts, names, dates, etc.) In another embodiment, the receipt processing module 366 and/or other modules in the expense processing system 350 (e.g., the cost categorization module 377) may use the receipt information obtained from the receipt data by the OCR/Recognition module.

The OCR/Recognition module 366 may use a database (e.g., a grammar database) to determine how the receipt data should be processed (e.g., to determine which grammar should apply to the receipt data). The information obtained from the receipt data by one or more of the recognition engines may be filtered and/or analyzed using a variety of methods and/or techniques to obtain information about an expense. For example, total amounts in an expense receipt may be obtained by searching for the largest amount (e.g., largest number) within an expense receipt that does not look like a date.

In another embodiment, the OCR/Recognition module 366 may also use contextual information to determine how receipt data should be processed. For example, depending on the location (e.g., the country) where an expense occurred, the amounts in an expense receipt may use a comma or a dot (e.g. 10,99 in Germany as opposed to 10.99 in the United States). Currency symbols can also be used to determine which numbers on an expense receipt are amounts instead of quantities, dates and/or numbers in an address or ZIP code. For example, the currency symbols "£," "$," "€," or "¥," may be used for the amount of an expense receipt. The contextual data (e.g., the location of an expense) and the currency symbols may be used to determine the amount of the receipt. In some countries, currencies can differ from the local currency used in the country. These countries may be flagged in a database (e.g., a location database or a currency database) for special processing, while other countries may use the type of currency directly from the country location determined for the expense.

In one embodiment, the OCR/Recognition module 366 may also use information from the receipt database to filter/recognize information. For example, when all previous receipts in the database for a given vendor have a total amount between X and Y, the total amount on the currently processed receipt may likely not be larger than X or smaller than Y. In another example, locations (e.g., city, state, country) from previous receipts of that user may be used to find locations on the currently processed receipt (e.g., the currently processed receipt is likely from the same locations as previous receipts).

In one embodiment, the OCR/Recognition module 366 may also use grammars to identify dates within an expense receipt. For example, dates may be identified using grammars of typical date formats (e.g., a mm/dd/yy format, a mm/dd/yyyy format, a mm.dd.yyyy, a dd/mm/yyyy, a dd-mmm-yy format, and/or a dd.mm.yy format). In another embodiment, if the receipt data does not include a date, the receipt processing module 365 may obtain a date using the contextual data associated with the receipt data (e.g., the date the image of the expense receipt was taken).

In another embodiment, the OCR/Recognition module 366 may also use grammars to identify location codes (e.g., ZIP codes) within an expense receipt. ZIP codes can be identified by using a grammar for the country where expense receipt originated (e.g., the country where the image of the expense receipt was taken). For example, if contextual data indicates that the receipt data (e.g., the image of the receipt) was obtained within the United States, then the OCR/Recognition module 366 may identify a 5 digit combination within a certain range as a ZIP code. Different formats for ZIP codes may be used depending on the location. In one embodiment, the OCR/Recognition module 366 may also use a particular date format based on the location for an expense receipt (e.g., the location where the receipt image was taken or the location of an address in the receipt).

In one embodiment, the OCR/Recognition module 366 may also use grammars to identify area codes and/or phone numbers within an expense receipt. For example, the contextual data or information obtained from the receipt data (e.g., the text of an address in the expense receipt) may provide a location (e.g., a country) for the expense receipt. The OCR/Recognition module 366 may use grammars to identify patterns the text of the expense receipt that match the country's phone number format (e.g., AAA-BBB-CCCC or (AAA) BBB-CCCC phone number formats in the United States).

In another embodiment, the OCR/Recognition module 366 may obtain a Uniform Resource Locator (URL) (e.g., a website address) in the text of the expense receipt. The OCR/Recognition module 366 may obtain a location (e.g., a country) based on a domain extension. For example, a URL ending in ".cn" may indicate that the expense receipt is from China.

As discussed above, the OCR/Recognition module 366 may use a variety of information to obtain a country for an expense receipt. Once the country for an expense receipt is obtained, more detailed information about the location of the expense receipt may be obtained. For example, a search can be run for city names within the country and a grammar may be applied to match the text in the expense receipt to find a likely match with a city name. In another example, once one or more of the city and country have been obtained, a search can be run for street addresses and a grammar may be applied to match the text (e.g., the receipt information) in the expense receipt to find a likely match with a street address. In another example the ZIP/postal code can be used to identify candidate locations. If one of these locations matches on the receipt, the country of the receipt may be determine. Similar techniques may also be applied to determining the city and/or state of an expense receipt.

In one embodiment, keywords which are identified but not matched to expense elements (e.g., name of a vendor, address/location of the vendor, phone number of the vendor, amount of the expense receipt, date of the expense receipt, etc.) may be added to description text associated with an expense receipt. For example, in an expense receipt for a restaurant, the individual dishes (e.g., scrambled eggs, beef, coffee, soft drink, etc.) may be added to a description text associated with the expense receipt.

As discussed above, the expense data (e.g., the receipt data and the contextual data) received by the receipt processing module 365 may provide information about an expense receipt. For example, the contextual data may include the GPS coordinates and/or the date when the receipt data (e.g., the image of the receipt) was obtained. However, the OCR/Recognition module 366 may process the receipt data (e.g., the image of the receipt) to identify text and/or other information within the receipt, using one or more grammars stored in a grammar database. The OCR/Recognition module 366 may obtain information which does not match the contextual data. For example, the ZIP code within the expense receipt may not match the location provided in the contextual data. In one embodiment, the information obtained by the OCR/Recognition module 366 may override the contextual data (e.g., the location in the text of the receipt is used instead of the GPS coordinates or location of a cell tower). In another embodiment, both sets of information (e.g., the contextual data and the information obtained by the OCR/Recognition module 366) may be stored and a human operator may user one of the interfaces 381 (e.g., the backend review tool 391) to determine which set of information should be used. In another embodiment, the same type of action (e.g., overriding data/information and/or storing both sets of information) may also be applied to dates, phone numbers, area codes, addresses, amounts, etc., and/or any other information obtained from the receipt.

In one embodiment, the receipt processing module 365, may use location data (e.g., a GPS coordinate or cell tower location information) provided in the contextual data to identify a set of possible city names, states, phone area codes, zip codes, airport codes, and/or counties. This set may also be generated based on knowledge about the location of the expense, the expense report, the user, and/or the account (e.g., the user typically travels to Germany on business or a particular account is typically used for d business travel expenses in France). This set can be used by the OCR/Recognition module 366 to reduce the search space and/or the amount of time to process the receipt data (e.g., the image of the expense receipt).

The location of other receipts in a submission can also help to determine if it was physically possible for a user to be at the location. For example, if a user had breakfast in Brazil, it is less likely that the user had lunch in Germany in the same day.

In one embodiment, the contextual data may include notes and/or information provided by the user when the expense data was submitted to the expense processing system 350. For example, as the user takes an image of an expense receipt, the user may enter a note indicating that the expense receipt is for lunch and that he had a ham sandwich. The receipt processing module 365 may also use these notes and/or information when processing receipts.

As discussed above, the OCR/Recognition module 366 may identify the currency of the amount of the expense receipt by identifying currency symbols (e.g., "$" "€", "USD", "EUR", "GBP" etc). The receipt processing module 365 may also identify the currency using contextual data (e.g., the location of the receipt). The receipt processing module 365 may convert the amount of the expense receipt into a home currency (e.g., the currency used in the country where the user resides and/or works). The home currency may be obtained from a setting/flag set by the user and/or from information stored in the user or account database. An exchange rate database may be used to determine the exchange rates between different currencies. With the exchange rate, the local expense amount may be converted into the home-currency amount. Both the local expense amount and the home-currency amounts may be provided to the report customization module 375 to generate an expense report.

In one embodiment, the receipt processing module 365 may also compute totals for all expenses of a certain category, all expenses of a certain type (e.g. cash vs. credit card or out of pocket vs. pre-paid), all expenses for certain accounts/codes/jobs/customers/projects or similar activities, as well as a total sum. The receipt processing module 365 may also calculate a reimbursement amount (e.g., how much money should be reimbursed to the user for the expenses) by subtracting pre-paid expenses from the total amount of expenses.

As discussed above, the report customization module 375 may allow for customization (e.g., selection of what type of data is presented and how the data is presented) of expense reports. The expense report may be customized based on a report template. The report customization module 376 includes a chart of accounts module 376, a cost categorization module 377, a report template generation module 378, a per-report customization module 379, and a per report customization module 380.

The report template selection module 378 may determine which settings to apply to other modules in the report customization module 375 and/or which report templates to use, based on a variety of criteria and/or inputs.

In one embodiment, based on the information provided by a user (e.g., settings and/or expense data), data contained in various databases and/or the upload module 355, the report template selection module 378 may choose which template(s), format(s) and/or feed(s) to generate from the expense data. For example, based which account is used, a certain format for an expense report can be selected from pre-defined formats in the account database or another database. In another example, based on the language used by a computing system, a language selected by a user, or a setting in a database (e.g., a user or account database), the report template selection module 378 may select a different format, feed, and/or template to select. In a further example, the report template selection module 378 may also use the type of account to determine which format, feed, or template to select. For example, the report template selection module 378 may include "call-to-actions" to purchase a full account (e.g., a link, advertisement, or option to purchase a full account), inside the expense report for a trial account. For a corporate account, the report template selection module 378 may allow a user to select a desired template, format, and/or feed for an expense report or expense feed, from a database or a list.

The report template selection module 378 may also define which chart of accounts, which documents to generate or which documents to load to insert the report data into, which reports to generate, the per-report customization, and/or the per-receipt customization to use by other modules in the report customization module 375. This information and the appropriate settings can be passed on to other modules during processing of expense data and/or generation of expense reports or expense feeds.

In one embodiment, there may be multiple per-report customization modules 379. For example, a different per-report customization module 379 may be used per account and/or per user. A different per-report customization module 379 may be used based on the account and/or user. For example, the per-report customization module 379 may be swapped out by a customer specific logic (e.g., user or account specific logic) and/or code section as identified by the report template selection module 378. If such a swap-out is configured (e.g., a per-report customization module exists), another code section, module or similar structure may be executed for a user instead of a standard customization module. Each user may have one or more customization modules configured in the expense processing system 350. For example, a first customization module may create an Excel expense report in format of company A as well as a PDF, a second customization module may create a PDF for each receipt, a third customization module may post the expense to particular web portal by filling out a web form, a fourth customization module may post the expenses to another system via an API or another interface, and a fifth customization module may create an Excel expense report in format of company B as well as another file format. In one embodiment, per-report customization modules may perform multiple combinations of actions (e.g., create an Excel expense report, create a PDF for each receipt, and post the expenses to another system via an API). In another embodiment, any number of different actions for customizing a report may be performed by the per-report customization module 378.

In one embodiment, the per-report customization module 379 can provide information including, but not limited to, an employee name (e.g., name of the user), an employee manager, a business unit, a travel destination, a start date, an end date, a cost center, project codes, a home currency or similar type of information, may be written to expense report and/or an expense feed.

In one embodiment, there may be multiple per-receipt customization modules 380. For example, a different per-receipt customization module 380 may be used per account and/or per user. A different per-receipt customization module 380 may be used based on the account and/or user. For example, the per-receipt customization module 380 may be swapped out by a customer specific logic (e.g., user or account specific logic) and/or code section as identified by the report template selection module 378. In one embodiment, the per-receipt customization modules may be used to format and/or enter information into expense reports and/or expense feeds. For example, a first per-receipt customization module may fill in the amount of an expense in column A and the date in column B of an expense report in Excel format, a second per-receipt customization module may fill in the amount in row A, the date in row B, and the currency in row C, and a third per-receipt customization module may store the receipt information in a certain temporary data structure for further processing or directly assign the information to certain fields (e.g., within a database) which may be accessed via an API or other interface. In one embodiment, any combination of actions for customizing the information for a receipt or expense within an expense report and/or expense feed, may be performed by the per-receipt customization modules 380.

This per-receipt customization module 380 may provide information related to each expense and the associated expense receipt. For each expense (e.g., for each expense receipt), expense data processed by the receipt processing module 365 (e.g., the OCR text of the receipt image and/or contextual data such as the location) may be written to an expense report and/or expense feed. For example, the amount in local currency, the exchange rate, the amount as converted by the applicable exchange rate, the description, the vendor name, the category, the project codes and/or any notes provided may be written to the expense report by the per-receipt customization module 380. In one embodiment, an identification tag may be generated by the per-receipt customization module 380 to link (e.g., associate) an entry in the expense report (e.g., an expense) to an image of the expense receipt in the same or another document. In another example, the per-receipt customization module 380 may enter an expense into an expense report in different formats (e.g., using different rows, columns or sheets) based on a category of the expense and/or based on a pre-determined format (e.g., a template) for the expense report.

In one embodiment, the chart of accounts module 376 may allow the expense processing system 350 to select a certain chart of accounts to categorize the expenses. Each chart of accounts may include a customer-facing category name (e.g., the name of the category of the expense which is seen by the user), an identifier (e.g., an account identifier or an alphanumeric identifier) assigned to each category, and a category label for display purposes within the expense processing system 350 (e.g., an internal name used by the expense processing system).

Table 1 below illustrates an exemplary chart of accounts definition for an expense report. As shown in Table 1, the customer-facing category name and the category label (e.g., internal name) are the same. Based on the chart of accounts shown in Table 1, each expense (e.g., each expense receipt) may be categorized as belonging to one or more of the categories in Table 1 (e.g., Lodging, Meals & Entertainment, etc.)

TABLE 1

| Customer Facing Category Name | Identifier | Category Label |
|---|---|---|
| Meals & Entertainment | 1003 | Meals & Entertainment |
| Rentals & Air Fares | 1001 | Rentals & Air Fares |
| Lodging | 1002 | Lodging |
| Parking & Tolls | 1004 | Parking & Tolls |
| Other Travel & Entertainment | 1005 | Other Travel & Entertainment |
| Supplies | 1006 | Supplies |
| Phone | 1007 | Phone |
| Misc | 1008 | Misc |

Table 2 below illustrates a different exemplary chart of accounts definition for an expense report. As shown in Table 2, the customer-facing category names are in German and the category labels (e.g., internal names) are in English. Based on the chart of accounts shown in Table 2, each expense (e.g., each expense receipt) may be categorized as belonging to one or more of the categories in Table 2 (e.g., Verpflegung & Bewirtung 19% MwSt, Verkehrsmittel 19% MwSt, etc.).

TABLE 2

| Customer Facing Category Name | Identifier | Category Label |
|---|---|---|
| Verpflegung & Bewirtung 19% MwSt | 1001 | Meals & Entertainment—19% VAT |
| Verpflegung & Bewirtung 7% MwSt | 1009 | Meals & Entertainment—7% VAT |
| Verpflegung & Bewirtung 0% MwSt | 1017 | Meals & Entertainment—0% VAT and Non-German |
| Verkehrsmittel 19% MwSt | 1002 | Transportation Fares—19% VAT |
| Verkehrsmittel 7% MwSt | 1010 | Transportation—7% VAT |
| Verkehrsmittel 0% MWSt | 1018 | Transportation—0% VAT and Non-German |
| Uebernachtung 19% MwSt | 1003 | Lodging—19% VAT |
| Uebernachtung 7% MwSt | 1011 | Lodging—7% VAT |
| Uebernachtung 0% MwSt | 1019 | Lodging—0% VAT and Non-German |
| Parken & Gebuehren—19% VAT | 1004 | Parking & Tolls—19% VAT |
| Parken & Gebuehren 7% MwSt | 1012 | Parking & Tolls—7% VAT |
| Parken & Gebuehren 0% MwSt | 1020 | Parking & Tolls—0% VAT and Non-German |
| Sonstiges 19% MwSt | 1005 | Other Travel & Entertainment—19% VAT |
| Sonstiges 7% MwSt | 1013 | Other Travel & Entertainment—7% VAT |
| Sonstiges 0% MwSt | 1021 | Other Travel & Entertainment—0% VAT and Non-German |
| Materialien 19% MwSt | 1006 | Supplies—19% VAT |
| Materialien 7% MwSt | 1014 | Supplies—7% VAT |
| Materialien 0% MwSt | 1022 | Supplies—0% VAT and Non-German |
| Telefon 19% MwSt | 1007 | Phone—19% VAT |
| Telefon 7% MwSt | 1015 | Phone—7% VAT |
| Telefon 0% MwSt | 1023 | Phone—0% VAT and Non-German |
| Verschiedenes 19% MwSt | 1008 | Misc—19% VAT |
| Verschiedenes 7% MwSt | 1016 | Misc—7% VAT |
| Verschiedenes 0% MwSt | 1024 | Misc—0% VAT and Non-German |

Table 3 below illustrates another exemplary chart of accounts definition for an expense report. Based on the chart of accounts shown in Table 3, each expense (e.g., each expense receipt) may be categorized as belonging to one or more of the categories in Table 3 (e.g., Meals, Breakfast, Lunch, etc.).

TABLE 3

| Customer Facing Category Name | Identifier | Category Label |
|---|---|---|
| Meals | F7800 | Meals |
| Breakfast | F7802 | Breakfast |
| Lunch | F7803 | Lunch |
| Dinner | F7804 | Dinner |
| Transportation | F7820 | Transportation |
| Lodging | 7821 | Lodging |
| Fuel | 7822A | Fuel |
| Entertainment | 7801 | Entertainment |
| Phone | 7900 | Phone |
| Other | ABCIKG | Other |

The chart of accounts module 376 may provide the expense processing system 350 with the capability to categorize expenses on a per account and/or user basis. For example, a specific corporate account may use one set of categories, while a different corporate account (e.g., for another company) may use a different set of categories. This allows the expense processing system 350 to sort expenses as specified by customers and/or users.

The categories (e.g., the chart of accounts) may be viewed, accessed, created, and/or modified using one or more of the interfaces 381 (e.g., using the backend review tool 391, account portal 392, employee portal 392, or other interfaces). The categories may also be provided in the expense reports and/or expense feeds generated by the expense processing system 350.

In one embodiment, the cost categorization module 377 may provide rules which determine when an expense should be labeled with a particular category. Such rules may take a variety of inputs to select one or more categories for an expense. For example, if a vendor is identified as a restaurant based on the name of the vendor or based on a database (e.g., a point of interest database, discussed in more detail below), a meal-related category can be selected. In another example, if the time of the expense (e.g., the context data or the time within the receipt) is in the morning and the vendor is a restaurant, the expense can be classified as a breakfast. In a further example, if the vendor name contains a common telecommunication carrier name in the country or location of the user, account, and/or expense, the expense is likely related to phone services. In yet another example, if the vendor name or the point of interest identifies the expense as originating from a gas station, the expense could be categorized as fuel.

In one embodiment, the cost categorization module 377 may use the chart of accounts module 376 to determine the appropriate categories for an expense. In another embodiment, the rules may be defined on a per chart of accounts basis (e.g., different charts of accounts use different sets of rules) and/or the rules may be automatically generated through a learning process where the expense processing system 350 system is trained using a set of receipts have already been classified. In one embodiment, the expense processing system 350 may use artificial intelligence systems, methods and/or algorithms to learn related inputs and outputs and generate a filtering engine such as a support vector machine (SVM) or other machine learning approach to categorize and/or classify expenses. The cost categorization module 377 may also use information generated by the receipt processing module 365 and/or the OCR/Recognition module 366.

The report generation module 370 may generate expense reports and save them for delivery. The report generation module 370 may use the per-report customization module 379 to insert data that is report-related. The report generation module 370 may loop over all processed receipts (e.g., processed expense data) that belong to the expense report by calling the per-receipt customization module 380. In one embodiment, depending on account and user settings, the list of processed receipts may contain all expenses for a given time space, for a project/customer/job or other activity, for a given user, for a given unit within an account, for a given account or any combination thereof, including expenses from prior expense submissions. In another embodiment, the list of processed receipts may include only the expenses from the current expense report submission (e.g. only the expenses from the current trip should be included). In a further embodiment, report generation module 370 may provide a summary of all the expenses occurred for a given user for the month so far or all the expense submitted into the expense processing system 350 for the user in the current month to date. The time used to determine the time frame for the summary may be obtained from a clock in the computing system of the user, an account time zone and/or general clock, and/or another time zone or general clock independent of the account of user.

The document creation module 372 may set up the document(s) or feed(s) based on an account or user database. The document creation module 372 may load existing documents using templates and then alter or insert values into the expense report and/or expense feed. For example, the document creation module 372 module can open an existing spreadsheet template defined for a particular customer and maintain it memory for follow-on modules to modify the template and ultimately deliver the final expense report through the document delivery module 371. The document creation module 372 may also create new documents from scratch (e.g., outputting a new PDF file). The document creation module 372 may initiate the creation of this document and may set properties to use in the generation of the expense report or expense feed.

The document delivery module 371 takes the finalized document(s) (e.g., finalized expense report) and delivers them to the user for access. In on embodiment, delivery can take place via email, network protocols such as FTP, HTTPS or any other communication protocol, other messaging mechanisms, physical mail or other delivery mechanisms. In another embodiment, the delivery can be accompanied by a message, for example an email addressed to the user or other contacts, that were previously identified that describes what is being delivered and for example for what period or trip. In one embodiment, the document delivery module 371 may deliver an expense feed with header information to identify the delivered information. The document delivery module 371 may also deliver multiple documents and/or multiple feeds. The delivery method can depend on the account and user as identified in the according databases.

Figure 3C:
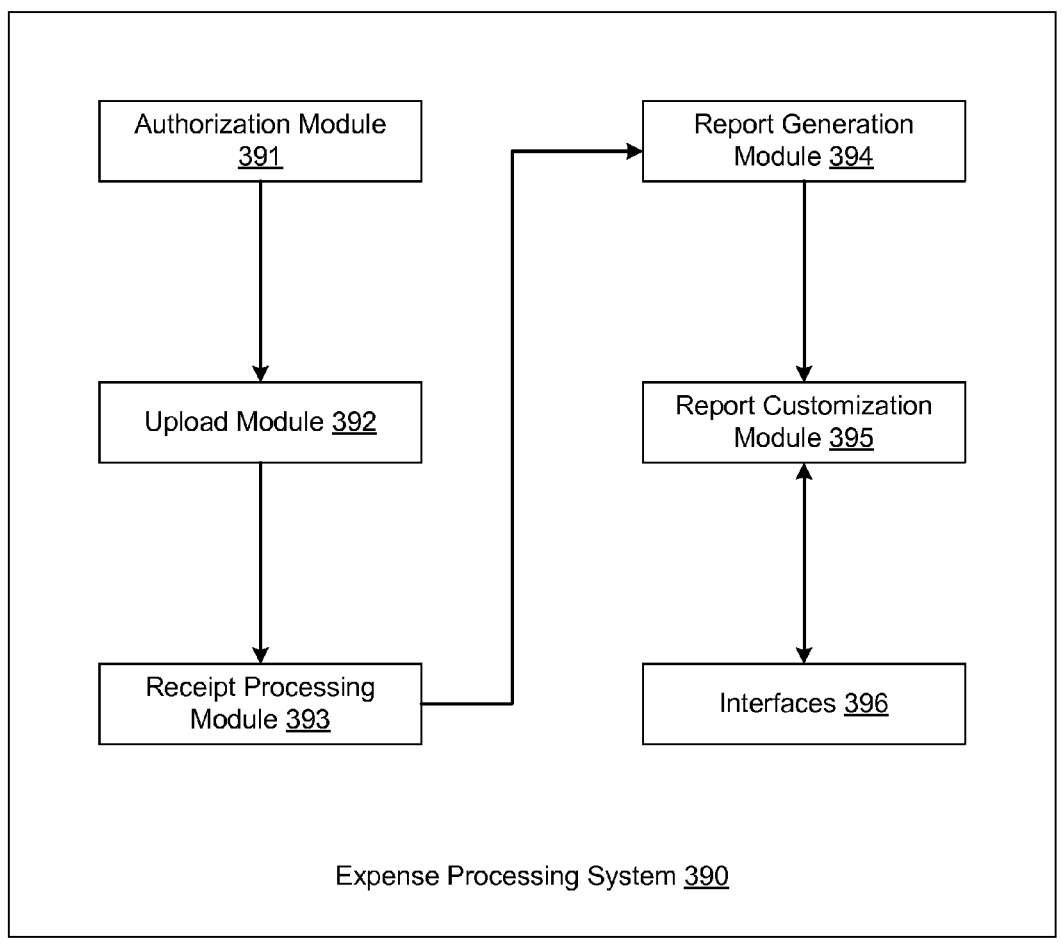
FIG. 3C is a block diagram illustrating an expense processing system, according to a further embodiment.

FIG. 3C is a block diagram illustrating an expense processing system 390, according to a further embodiment. The expense processing system 390 may include an upload module 391, an authorization module 392, a receipt processing module 393, a report generation module 394, a report customization module 395, and one or more interfaces 396. In one embodiment, the modules of the expense processing system 390 may be located on one or more of the servers 110 shown in FIG. 1. More or less components may be included in the expense processing system 390 without loss of generality.

As discussed above, the authorization module 391 may authenticate a user before permitting a user to submit expense data (e.g., images of receipts and/or contextual data). The upload module 392 receives the expense data after the user has been authenticated and provides the expense data to the receipt processing module 393 for processing. The receipt processing module 393 may process the expense data (e.g., OCR the image of the receipt to obtain receipt information such as amounts, times, locations, etc.) and may use various grammars and/or databases to process the expense data. The receipt processing module 393 may provide a list of user expenses to the report generation module 394. The report generation module 394 may use the report customization module 395 to format an expense report according to a template and provide the appropriate expense information in the expense report. The interfaces 396 may be used to access, maintain, and/or manage the expense processing system 390.

Figure 4:
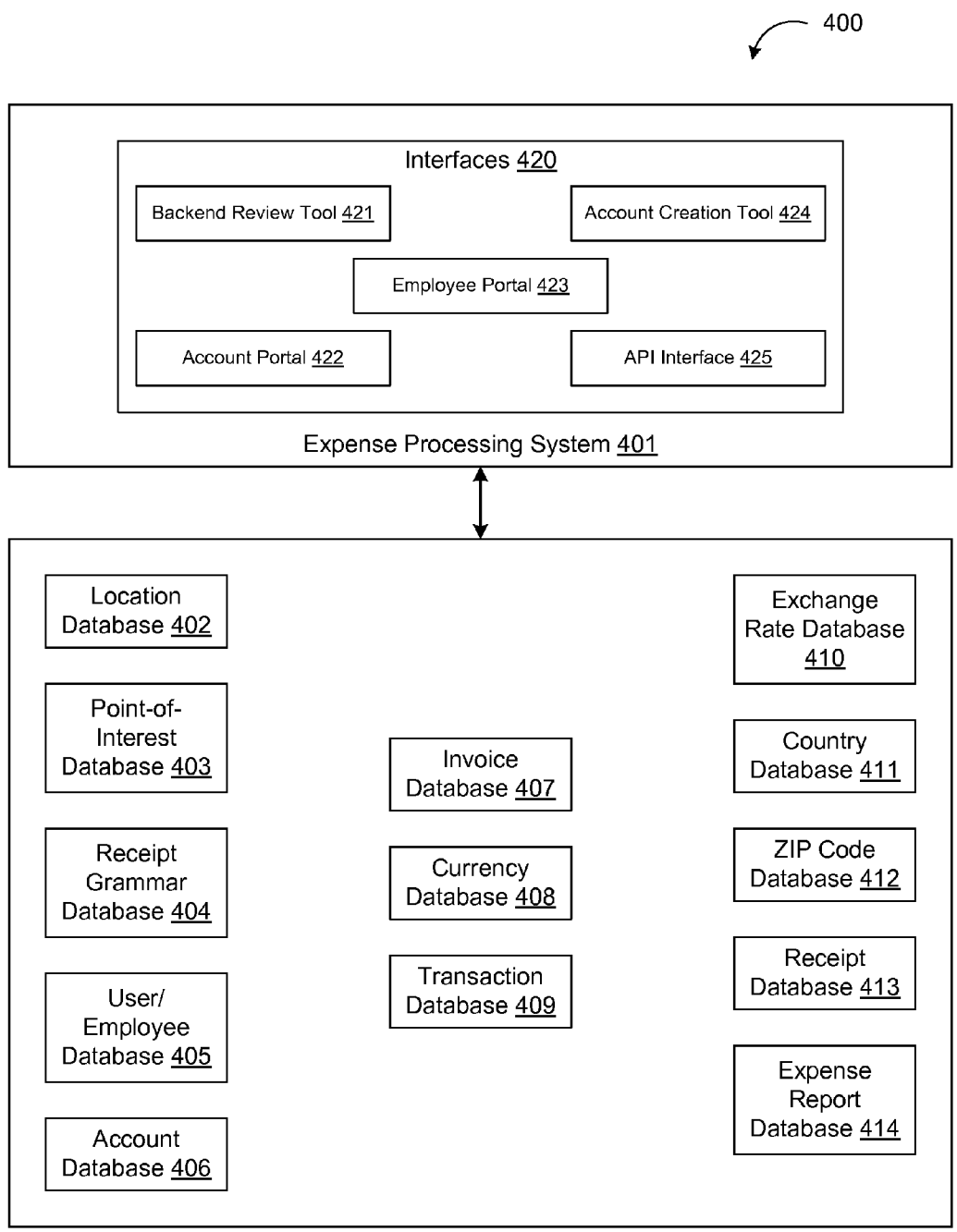
FIG. 4 is a block diagram illustrating an exemplary system architecture according to one embodiment.

FIG. 4 is a block diagram illustrating an exemplary system architecture 400 according to one embodiment. The system architecture 400 includes an expense processing system 401 which may be similar to the expense processing systems 300, 350, and 390, shown in FIGS. 3A, 3B, and 3C, respectively. As discussed above, the expense processing system 401 may receive expense data (e.g., receipt data such as an image of an expense receipt and/or contextual data such as the location or time the receipt data was obtained) from one or more computing systems (not shown in the figure) via a network. The expense processing system 401 may process the receipt data to generate an expense report and/or an expense feed. In one embodiment, the expense processing system 401 may communicate with a variety of databases in order to process expense data and/or to generate an expense report/feed.

In one embodiment, the various databases may reside on a backend system, on one or more servers accessible via a network (e.g., the internet), on one or more local servers, and/or in a cloud. Although the various databases are shown being separate from the expense processing system 401, in other embodiments, the one or more of the databases may be part of the expense processing system 401 (e.g., may reside on one or more of the servers 110 shown in FIG. 1). It should be understood that each of the databases may be one or more of a relational database (e.g., a Structure Query Language (SQL) database), an entity-relationship database, an object model database, an XML database, an object-relational model database, and/or any other type of system which allows for the storage and querying of data. It should also be understood that the data stored within the databases may be stored using a variety of formats (e.g., as tables, text files, XML files, as objects in memory, etc.) and that the data may be encrypted/decrypted for security purposes (e.g., a table or a field within a table may be encrypted/decrypted).

The location database 402 may store the relationship between location values (e.g., GPS coordinates, longitude and latitude values), cities, states, counties and/or countries. The location database 402 may also contain street names or addresses for look-up of locations based on incoming location information (e.g., contextual data such as longitude/latitude, cell tower locations, an address obtained by processing an image of a receipt, and/or other location identifiers). The location database 402 may also be combined with other database to perform multiple functions (e.g., can be combined with the Points-Of-Interest (POI) database 403)

The Points of Interest (POI) database 403 may contain points of interests (POIs). The POI database 402 may allow the expense processing system 401 to find POIs based on incoming location information (e.g., contextual data such as longitude/latitude, cell tower locations, an address obtained by processing an image of a receipt, and/or other location identifiers). In one embodiment, each POI stored within the POI database 403 may include the name of the POI (e.g. the name of a restaurant, a hotel or store), a category of the POI (e.g. restaurant, hotel, airport, etc.) and/or the location of the POI (e.g. longitude and latitude or ZIP code).

In another embodiment, the POI database 403 may allow the expense processing system 401 to search for POIs based on the name of the POI (e.g. a certain vendor). This search may also include a location constraint such (e.g., a search for a certain vendor within a certain radius of the location, within a certain distance of the location, within a square/rectangle of the location, or a search within a certain county, state and/or country). In one embodiment, based on the location of the expense (e.g., based on the contextual data or based on an address obtained from an image of a receipt) a set or list of vendors in proximity to the location may be identified by searching the POI database 403. These vendors (e.g., the names of the vendors) can be matched against the data obtained by the OCR/Recognition module 366 to identify possible matches. In another embodiment, POIs in proximity of the location identified for the expense can be displayed in the backend review tool 391 to give additional options in case a human operator wishes to check and/or correct the results from the processing of the expense receipts (e.g., the processing of the expense data). The identified POI and the category of the POI may also allow the cost categorization module 377 to assign a category by applying the chart of accounts customization and matching it against the POIs using a rule engine in the cost categorization module 377.

The receipt grammar database 404 may define different the grammars to be applied based on all available input parameters. As discussed above, the OCR/Recognition module 366 as well as other modules may these grammars to process the expense data and generate expense reports and/or expense feeds based on the expense data. For example, a grammar can define how to determine the total amount on a receipt, by taking all patterns in the output from an OCR engine and identifying those that look most like numbers with a "," or a "." symbol. Depending on the location of the expense, the receipt grammar database may have different grammars for different locations (e.g., in the United States, the "." represents a decimal point, but in Germany, the "," represents a decimal point). In another example, the grammar may be used to search for the biggest number (e.g., the most likely number to be an amount) out of a set of the detected numbers. In one embodiment, the grammar may include a function/rule to exclude patterns that look like typical zip or postal codes in the region, as well as patterns that look like dates or time indicators or seem to be more likely part of a street address on the receipt, when identifying the amount of the receipt. In one embodiment, a grammar may be used to detect zip codes by looking at the country or region as an input and looking up typical zip codes either by defining a pattern or by communicating with the location database 402. In another embodiment the grammars may be used to detect anti-terms and terms which, respectively, may exclude parts of the receipts to be used for certain categories (e.g. vendor or city name) or may indicate that a part of the receipt belongs to a certain category. In a further embodiment the grammar may also describe a format to recognize a phone number on the receipt. These grammars can often also tolerate errors in the output from an OCR engine using various techniques.

The User/Employee database 405 may contain information about users or employees accessing the expense processing system 401. The User/Employee database 405 may be structured in different ways, for example to include all users system-wide or to include only certain users for a company, a particular account, a particular type of account or a certain unit or group independent or within another entity.

The User/Employee database 405 may include an identifier to uniquely identify a user, the email address, phone number, first/last name, employee ID, phone number, and/or other contact information, of a user. The User/Employee database 405 may also include a SKU identifier, that identifies what type of account or features the user has access to, an account id that can look up an account in the account database 406 that the user is part of or has access to (could also contain multiple accounts a user has access to), an account name to look up the name of the account (could also be stored in the account database), and/or an activation password/code generated by the authentication module 360 or generated by other methods defined by the user. The User/Employee database 405 may also store the type of computing system the user uses to access the expense processing system 400, a computing system name that describes the device in more detail (e.g., model number, device name, etc.), an identifier or description of the operating system the users uses on their computing system, a flag that can track whether the information has been modified for use by different interface or modules and to ensure information does not get overwritten by simultaneous access, the version of the application being used on the computing system, and/or a unique device identifier such as an IMEI or serial number provided by the computing system.

The User/Employee database 405 may also include the time and/or date of the first authentication of the user with the expense processing system 401, the time and/or date of the most recent authentication of the user with the expense processing system 401, the number of trial expense submissions that a user has left (for example when a user gets a trial account with a certain number of reports or credits). The User/Employee database 405 may also include the name of the user's manager, the email of the user's manager, the location or a description of the location of where the user works, the business unit or description of the business unit in which the user works, and/or the region or territory that a user serves (e.g. in the case of a sales person). The User/Employee database 405 may also include the location of the most recent authentication by the user, the city, state and/or country of the most recent authentication by the user, the location of the first authentication by the user, the city, state and/or country of the first authentication by the user. The User/Employee database 405 may also include the language or a language identifier that identifies the language used on the user preference or as chosen by the user, the country or a country identifier that identifies the home country of the user's computing system or as chosen by the user, and/or the home currency that the user or another person indicated as a default setting for the currency.

The User/Employee database 405 may also include the number of credits, submissions and/or reports remaining in case an account type or SKU requires tracking of credits, reports or submissions, the number of credits, submissions and/or reports available for the user as part of the account or SKU in case an account type or SKU requires tracking of credits, reports or submissions, the time and/or date to identify the beginning of a service interval (e.g., the period of time in which the user is allowed to use the expense processing system 401), and/or the duration of a service interval, and/or the end date of service interval. User/Employee database 405 may also include definitions of templates to be used for this user in case there are specific customizations to be applied by the report customization module 375 for this user. Customizations may include a document to fill in expense data, a chart of account definition, and/or any logic to be applied during report generation and/or any logic to be applied on a per receipt basis for this account. The User/Employee database 405 may further include a username to access the user's profile, account or expense data, a password to access the user's profile, account or expense data, and a unique identifier such as the ID, email, device registration number, and/or other identifier can be used to uniquely identify a certain user in a look-up. In one embodiment, a requestor may not be granted access to the User/Employee database 405 without proper authorization (e.g., only administrators or the users have credentials to access the User/Employee database 405).

The account database 406 may contain information about accounts with access to the expense processing system 401. The account database 406 may be structured in many ways, for example to include all accounts system-wide or only certain accounts, particular types of accounts or other subsets of accounts. The account database 406 may also be integrated with other databases such as the User/Employee database 405.

The account database 406 may include an identifier to uniquely identify an account, an account name to describe the account, owner of the account, or entity/group for which the account was created, an account id to identify the account (which can be reused on customer-facing documents and/or could differ from other identifiers contained in the database), a username to access the account, and/or a password to access the account. The account database 406 may also include the number of seats that the account provides. In one embodiment, each seat allows the assignment of a user to the account. The account database 406 may further include the currency for billing the account holder, the currency to be used by default as home currency by users of the account, the setup fee that was charged when creating the account, any additional service or support fees that get charged to the customer on an on-going basis (e.g. an annual charge, a per submission charge, a per receipt charge, etc) and/or more detailed definitions of charges at certain events and price levels for a particular account.

The account database 406 may include a flag that defines if this account has access to a feature that allows users to distinguish corporate card, charge card, or pre-paid expenses from cash, personal or out-of-pocket expenses, and/or a flag that defines if this account has access to a feature that allows users to sort their expenses by activity where an activity could be defined by items such as customer codes, names, project codes, job codes, or other representations. The definitions of activities may be stored in another database or on another device (e.g., a server) within the expense processing system 401. The account database 406 may also include a flag that defines if this account has access to a feature that allows users to consolidate credit card information with their expenses generated through the expense processing system 401 by automatically comparing imported credit card statement information with expense generated through the analysis of receipts, and/or a flag that defines if users of accounts will get a monthly report (or reports for other time-intervals such as weekly, certain time spans) or will rather get reports on a per trip or per submission basis.

The account database 406 may include definitions of templates to be used for this account in case there are specific customizations to be applied by the report customization module 375 for this account. As discussed above, customizations can include a document to fill in expense data, a chart of account definition, any logic to be applied during report generation, and/or any logic to be applied on a per receipt basis for this account. The account database 406 may also include email address(es) to which send electronic invoice or billing information, the contact names of any billing contacts, any information describing or identifying certain payment instructions such as for example a certain Purchase Order (PO), the start date of the service and/or the account, address information for billing, and/or address information for the account or customer.

The account database 406 may include the number of credits, submissions and/or reports remaining in case an account requires tracking of credits reports or submissions, the number of credits, submissions and/or reports available for the account in case the account requires tracking of credits, reports or submissions, end date of account, a service interval for the account, flags that identify the status of the account such as active or not, and/or a unique identifier such as the ID, account id or other identifier which can be used to uniquely identify a certain account in a look-up. Access to the account database 406 may require authorization (e.g., a user or administrator may need to provide credentials to access the account database 406). In one embodiment, user information (e.g., a user's name or address) can also be used to look up an associated account.

The invoice database 407 may store invoices to bill account holders and/or users for usage, setup or other purposes. The expense processing system 401 may access the transaction database 409, account database 406 and/or the user/employee database 405 to generate invoices.

The invoice database 407 may include an identifier to uniquely identify an account, an account name to describe the account, owner of the account, or entity/group for which the invoice was created, an account ID to identify the account (which can be reused on customer-facing documents, and/or could differ from other identifiers contained in the database), the text, copy or other representation of the invoice or a reference to an invoice or file. The invoice database 407 may also include the start time and/or date of the service period covered by the invoice, the end time and/or date of the service period covered by the invoice, the currency used in the invoice, the amount due, a billing email or other form of contact alias, a billing address or location, and/or a flag that determines whether or not the invoice has been paid In one embodiment, the expense processing system 401 may look up invoices based on account information and/or generate invoices by accessing the transaction database 409, user/employee database 405 and/or account database 406. For example, one component of the expense processing system 401 may loop over the existing accounts or transactions to generate invoices for a given period, while another component can deliver the invoices based on the billing information.

The currency database 408 may link currency codes, currency names, countries, country names and/or other related entities. For example, the currency database 408 may allow look up of a country based on a currency code or symbol detected in a receipt by another module. In another example, currency database 408 may allow the expense processing system 401 to look up a currency based on an identified country.

The transaction database 409 may store transactions that occur within the expense processing system 401 (e.g., a particular submission of an expense receipt, a change in configuration such as addition/removals of features or increases/decreases of the number of seats for a given account, etc.) In one embodiment, different databases may store logs (e.g., lists of transactions) for different account types.

The transaction database 409 may include an identifier to uniquely identify a transaction, the email of a user that triggered the transaction, the account id of the related account, the type of charge associated with a transaction, a SKU identifier or number associated with the transaction, the amount associated with the transaction, the currency associated with the transaction, a description of the transaction, and/or the date and/or time of when the transaction took place.

In one embodiment, the transaction database 409 may allow the expense processing system and/or a human operator to loop over and/or search for transactions that took place. For example a human operator may use the transaction database 409 to look up transactions for particular time periods, accounts, users, types of charges, and/or other attributes.

The exchange rate database 410 may allow the expense processing system 401 to identify exchanges rates given two input currencies, and optionally a date and/or time.

The exchange rate database 410 may include an identifier to uniquely identify a combination of exchange rates, an optional date and/or time of when expense was incurred, and/or an optional date and/or time to use for identifying an exchange rate. The exchange rate database 410 may also include a currency identifier to identify the source currency and/or a currency identifier to identify the target currency. In one embodiment, the target currency may be standardized for a given database and other currencies may be excluded from the database. For example, all exchange rates are stored against the U.S. dollar or another currency.

The country database 411 may allow the expense processing system 401 to lookup countries and related information for the countries. The country database 411 may include different types of country codes, the name of the country, the currency code and/or name for the given country, other information of the country such as the capital, ZIP code formats, phone formats, languages used.

The ZIP/postal code database 412 may allow the expense processing system 401 to look up ZIP codes and related information. The ZIP code database 412 may include a country code or information related to the zip code, a ZIP/postal code, a name of the place related to the ZIP code, different region descriptors of lower and/or high level geographic hierarchies, longitude and latitude center of the ZIP code, and/or other geographic descriptions of the area where the ZIP code applies. In one embodiment, the expense processing system 401 may look up a ZIP code based on a location data (e.g., the contextual data such as a GPS coordinate or a ZIP code obtained from an image of the receipt).

The receipt database 413 may store receipts and related data for processing. The receipt database 413 includes an identifier to identity a particular receipt, an identifier to identify the expense report that a receipt belongs to, a date and/or time stamp of when the expense took place, a location identifier of where the expense took place (e.g. longitude/latitude and/or another location identifier), the city of where the expense took place, the state of where the expense took place, and/or the country of where the expense took place, the currency used on the receipt. The receipt database 413 may also include the amount of the expense, the amount of tax paid, the amount of tip given, a description of the expense, the vendor that was paid, the category or type of expense, a label describing the category or type of expense, notes associated with the expense, a purpose of the expense, attendees during the expense (e.g. dinner participants), a project, job, case, or other activity identifier associated with the expense. The receipt database 413 may further include the form of payment, the credit card used, a flag to identify whether the expense was company paid or not, a date and/or time stamp of when the system started processing the expense, a date and/or time stamp of when the system ended processing the expense, an identify the stage of processing of the receipt (e.g. complete, not started, OCR/recognition-processed or other), a reference to a receipt image file and/or image data of the receipt, an amount of distance traveled, the unit of the distance traveled (e.g., kilometers or miles).

Data (e.g., the receipt image and/or contextual data for the expense receipt) can be stored into the receipt database 413 when it is initially received by the upload module 355. As follow-on modules process the receipt data (e.g., the OCR/Recognition module 366 or manual entries through the backend review tool 391) the data in the receipt database 413 may be modified and/or updated. Receipts can be looked up through associated information such as the through the associated expense report.

The expense report database 414 stores expense reports and related data (e.g., expense data, receipt data, contextual data, etc.) for processing. The expense report database 414 may include an identifier to uniquely identify the expense report, an identifier to link each receipt to the appropriate expense report, the email or other identifier of the user that submitted the report, and/or other contact emails or aliases to identify contacts that the expense report should be forwarded to. The expense report database 414 may also include the home currency to be used for the expense report, a cost center, profit center, job code, customer coder or other activity identifier the expense report is associated with, a cost center, profit center, job code, customer coder or other activity label to describe the activity the expense report is associated with, and/or an account identifier and/or account name to link the expense report to a particular account. The expense report database 414 may further include the submission time and/or date of the expense report processing, the start time and/or date of the expense report processing, the end time and/or date of the expense report processing, and/or an identify the stage of processing of the receipt (e.g. complete, not started, or others).

Expense data (e.g., the receipt image and/or contextual data for the expense receipt) can be stored into the receipt database 413 when it is initially received by the upload module 355. As follow-on modules process the receipt data (e.g., the OCR/Recognition module 366 or manual entries through the backend review tool 391) the data in the expense database 414 may be modified and/or updated. Expense reports which are generated can be looked up through associated information such as the associated user, account and/or start and/or end time.

The interfaces 420 of the expense processing system 401 may be used to access, interact, maintain, and/or manage the databases described above. The interfaces 421 include a backend review tool 421, an account portal 422, an employee portal 423, an account creation tool 424, and an API interface 425.

The backend review tool 421 may allow human reviewers to double check expense data processed by the expense processing system 401 and the information obtained from processing the expense data (e.g., OCR text, locations, dates, times, amounts, etc.). The backend review tool 421 may provide access to information including: a receipt picture (e.g. in a picture navigation tool with capabilities to zoom, rotate or otherwise manipulate the picture), a vendor name (e.g. showing the recognized vendor name and allowing editing), city, state, country, currency, amount, tax amount, cost category, applicable tax rate, notes, and/or descriptions for a receipt. The backend review tool 421 may also provide access to information such as a distance for a trip, list of participants in an expense, start and destination of a trip, type of vehicle used, and/or project, customer, cost center codes In one embodiment, the backend review tool 421 may also keep certain information anonymous, so that the human reviewer cannot see which account or user the data relates to. The backend review tool 421 may also be used to classify an non-receipt image so that it can be excluded or marked accordingly in an expense report, classify an image as non-recognizable so that it can be excluded or marked accordingly in an expense report, look up keywords, search for specific locations e.g. by entering a city name, state, zip code, phone number of name of a place or vendor, and/or select the currency based on the country.

The backend review tool 421 may use assignment rules which may assign the review of receipts to particular sets of staff (e.g. by looking at incoming data such as country, region, state, type of expense, currency, or other attributes). The assignment rules may also allow for re-assignment of receipts to another reviewer in case they haven't processed within certain time-frames or performance criteria. Multiple reviewers can be setup to review the same receipts so that algorithms can then determine statistically which results are correct (e.g. if one reviewer out of three makes an incorrect edit, the expense processing system 401 can take the correct edit). Reviewers may receive notifications when new receipts have been assigned and are ready for review, e.g. by email, or any other message or notification mechanism.

In one embodiment, the backend review tool 421 may track performance data such as time completion, volume of receipts reviewed, quality, accuracy and other metrics can be captured for future analysis or other use e.g. by the assignment rules on a per reviewer basis as well as on a group, aggregate or average level to benchmark the reviewers.

In one embodiment. this backend review tool 421 may be triggered automatically or become an optional step when the expense processing system 401 is unable to process expense data or determines that there may be an error in the processed expense data (e.g., text within the receipt is blurry and/or unreadable). In one embodiment, a probability may be associated with the likelihood of a correct recognition and may be use by the expense processing system to determine whether the backend review tool 421 should be triggered.

The account portal 422 allows an account manager to access, edit and review account-related information. The account portal 422 may allow a human operator to review and edit billing information, review and edit account settings, review and edit account configurations, review pricing and billing terms, review and pay invoices. The account portal 422 may also be used to change account username or passwords, review, edit and create employee entries including. employee information such as an employee's first name, last name, email, employee ID, manager's email, manager's name, unit, cost center, region, location or other related information. The account portal 422 may further allow a human operator to review usage statistics of the system, review financial or return on investment (ROI) statistics of the expense processing system 401 by comparing the time spent using prior expense processing methods and the time spent using the expense processing system 401, or by running other type of analysis.

The account portal 422 may be used to review, generate or re-create reports, expense reports for groups, sub-groups, or an entire account, select users or individual users as needed, review statistics and analysis of an account's expenses, and/or create, edit and review policy rules such as: a maximum amount to be spent in a category, expenses that cannot be expensed, and any other rules given all available input parameters to either exclude certain expenses. The account portal 422 may also be used to warn the user or automatically create out-of-policy notifications to a set of contacts, set other account access rights (e.g. give users right to access the account portal or an employee portal), purchase or request additional features or seats, assign employees to seats, trigger customer support requests, create, edit or review customer codes, cost centers, project codes, profit centers, activities or similar representations and structures for use by the system, and/or inform users about the service and distribute manuals or software to them for deployment.

The account portal 422 may communicate and/or interact with the user/employee database 405, the account database 406, and/or other databases as needed and may provide an interface (e.g. through a website or other user interface) for a human operator (e.g., an account manager to interact) access, maintain, and/or manage accounts.

The employee portal 423 may provide users with the ability to edit their profile information, review usage statistics, review submitted expense and/or receipts, re-create reports as appropriate for particular dates, locations, trips, projects or other criteria, edit expense information, send expense receipts or reports to other users or contacts for review, approval or processing, review whether expenses have been paid and/or approved and the overall status of an expense report (e.g., report generation in progress, report created, report submitted for review, etc.).

The account creation tool 424 may allow the expense processing system 401 to create accounts. The account creation tool 424 may allow a user to enter an account ID, an account name, billing contact information, features activated on the account, pricing for the account, a list of initial users, username and password for initial log-in, and/or a start date of account service.

In one embodiment, the account creation tool 424 can also a user to activate or deactivate certain accounts, review usage patterns, review profitability based on the time and resources spent for processing versus the revenue generated for the company. In another embodiment, the account creation tool 424 can also be used to delete accounts.

The Application Programming Interface (API) interface 425 may provide access to one or more modules of the expense processing system 401 (e.g., the receipt processing module 365, the report customization module 375, etc.), to expense data (e.g., receipt data such as images or contextual data), and/or to select databases using an API allows for remote access. For example, an HTTPS, SSL, HTTP, TCP and/or FTP connection may be established with the expense processing system 401 to send and/or receipt data using a pre-defined interface to another computer or device. In another example, an API call (e.g., a function call) to a module within the expense processing system 401 may be used to obtain data (e.g., an expense report, an image of a receipt, contextual data) if the API call is authenticated and validated against the account and/or user database. In one embodiment, the API interface 425 may allow the integration of the expense processing system 401 within a larger workflow, process and/or with other existing systems.

The API interface 425 may also be used to transmit data to a third-party server (e.g. for further processing). For example, this data can be an expense report, user data, statistics, etc. In one embodiment the expense processing system may communicate with the third-party server and may send information (e.g., data) about an expense report via an API call on that server. The information may be transmitted using an HTTP-based or an SSL-based URL. For example, the expense processing system may access an URL for the server, to transmit the information to the server. In another embodiment the expense processing system may automatically transfer data from the expense report into another third-party system by posting it into web pages (e.g., on HTML and/or JavaScript).

It should be understood that in other embodiments, the various modules shown in the expense processing system 350 of FIG. 3B and/or the various databases shown in FIG. 4 may reside in various locations, such as the computing system 102 and/or the servers 110 shown in FIG. 1. For example, the OCR/Recognition module 366 may be located in a computing system 102 rather than on a server 110. In another example, the currency database 408 may reside on the computing system 102. In a further example, the report generation module 370 may reside on the computing system 102, rather than on a server 110.

Figure 5:
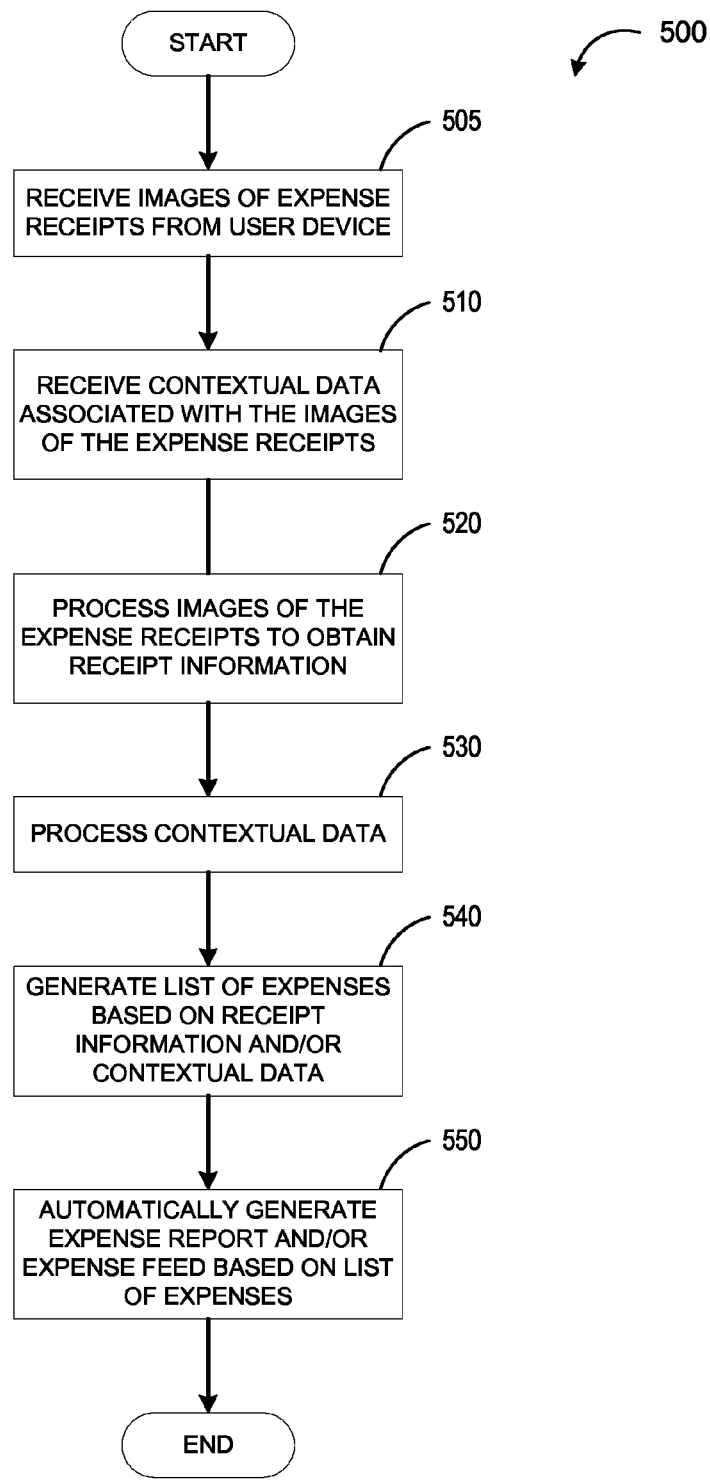
FIG. 5 is a flow diagram illustrating a method of processing receipts, according to one embodiment.

FIG. 5 is a flow diagram illustrating a method 500 of processing receipts, according to one embodiment. The method 500 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 500 is performed by embodiments of the expense processing system as described herein.

Referring to FIG. 5, the method 500 starts with receiving one or more images of expense receipts from a user device (505). Each image may be an image of an expense receipt. At block 510, contextual data associated with the images (e.g., the location and/or time the image was taken) is optionally received. Contextual data may be received together with the images or in a separate transmission. The images of the expense receipts are processed at block 520 to obtain receipt information (e.g., to obtain text within the receipt) at block 520. The contextual data is also processed at block 530. At block 540, a list of expenses is generated based on the receipt information and/or the contextual data. Based on the list of expenses, an expense report and/or an expense feed are generated at block 550.

Figure 6:
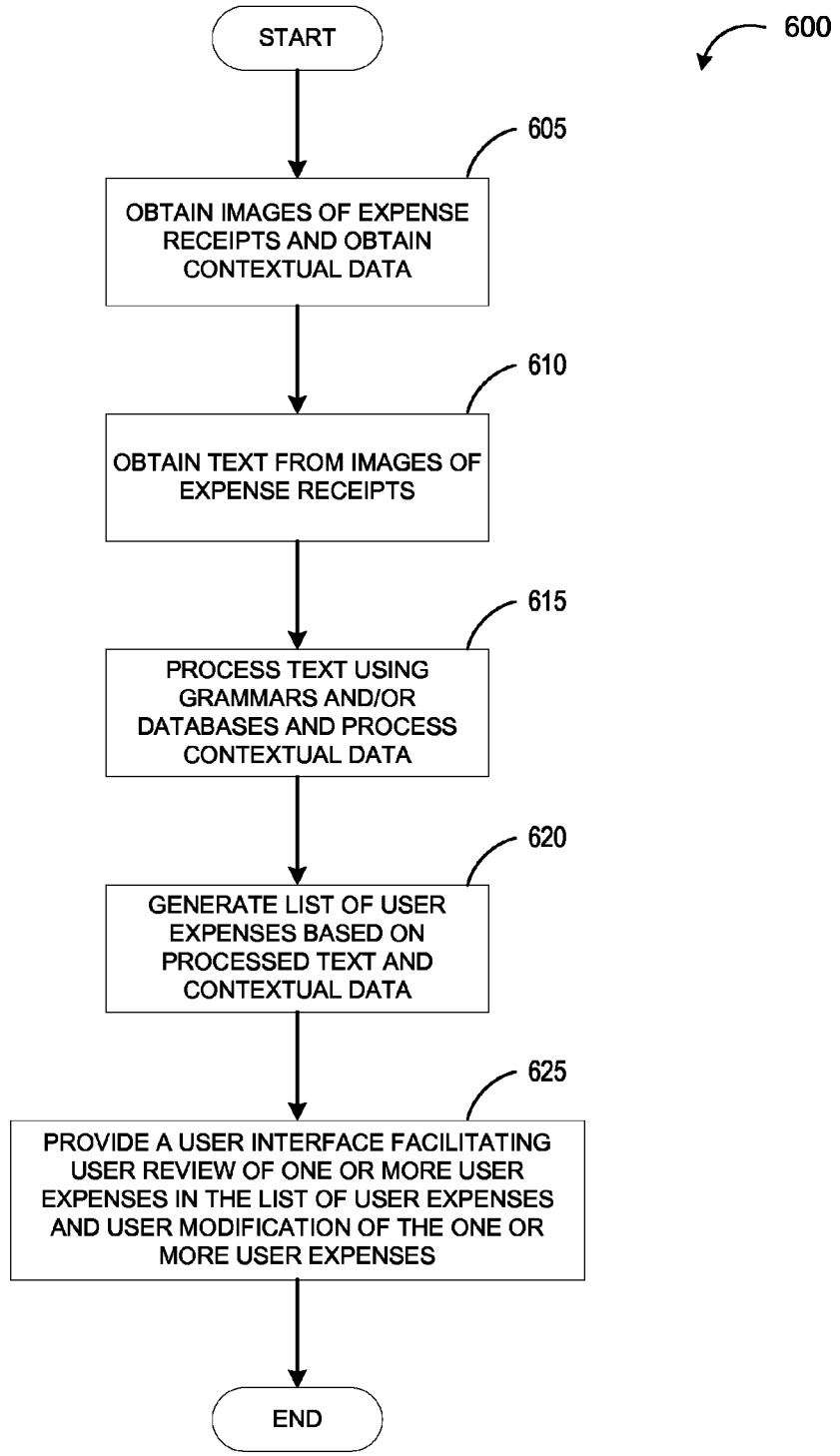
FIG. 6 is a flow diagram illustrating a method of processing receipts, according to another embodiment.

FIG. 6 is a flow diagram illustrating a method 600 of processing receipts, according to another embodiment. The method 600 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 600 is performed by embodiments of the expense processing system as described herein.

Referring to FIG. 6, the method 600 starts with obtaining images of expense receipts and obtaining contextual data associated with the images of the expense receipts (block 605). At block 610, text from the images of the expense receipts is obtained. The text is processed using grammars and/or databases at block 615. The contextual data is also processed at block 615. A list of user expenses is generated based on the processed text and the processed contextual data (block 620). At block 625, a user interface facilitating user review of one or more user expenses in the list of user expenses and user modification of the one or more user expenses is provided. This may allow a user (e.g., a human operator) to update one or more of the user expenses, correct errors, and/or resolve any inconsistencies between the processed text and the processed contextual data.

Figure 7A:
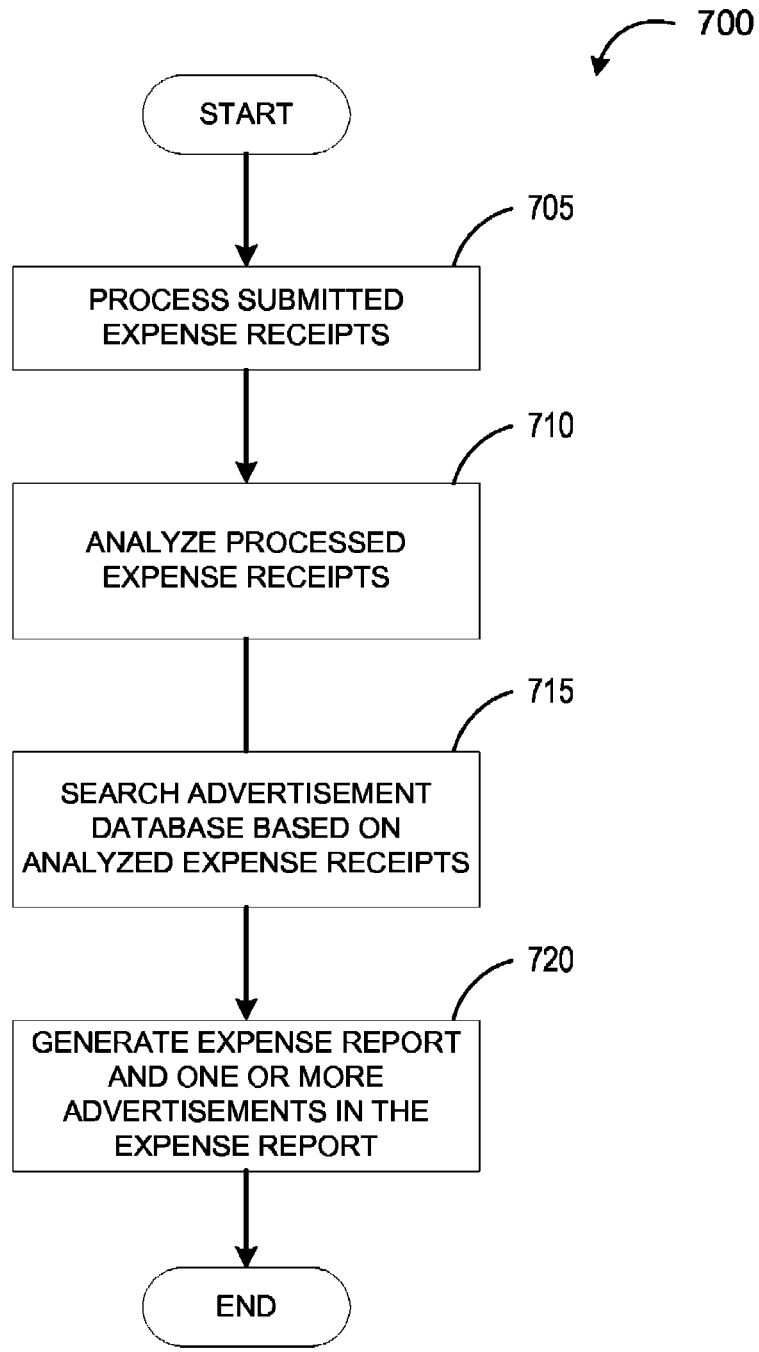
FIG. 7A is a flow diagram illustrating a method of using an expense processing system, according to one embodiment.

FIG. 7A is a flow diagram illustrating a method 700 of using an expense processing system, according to one embodiment. The method 700 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 700 is performed by an expense processing system as described herein of by an external system (e.g., an advertising system) which communicates with the expense processing system.

Based on the expense data, an advertisement may be displayed to the user. For example, the advertisement may be placed next to a receipt image in an expense report or in an expense line in the report. In another example, the advertisement may be included in a communication used to transmit the expense report to a user (e.g., included in an email of text message). The advertisements may be placed in the expense report or in the communication with the expense report based on a user's expense profile. In one embodiment, advertisers may select particular attributes that they want to target based on future expense or receipts, based on past behavior (e.g., past expense receipts), or based on a users' expense profiles or role in the company.

For example, an advertiser could choose to target users that have purchased coffee at Company A in a certain region, or users that fly at least once a month and spend money on car services, or users that work for Company B and stay in hotels of Company C, or users that spend at least $500/month and travel to country X at least once a year, or users that have at least one business dinner every week.

Referring to FIG. 7A, the method 700 begins with processing submitted expense receipts (e.g., expense data) at block 705. At block 710, the processed expense receipts (e.g., processed expense data) are analyzed. An advertisement database is searched based on the analyzed expense receipts (block 715). At block 720, an expense report and/or an expense feed is generated and one or more advertisement are included in the expense report and/or expense feed.

Figure 7B:
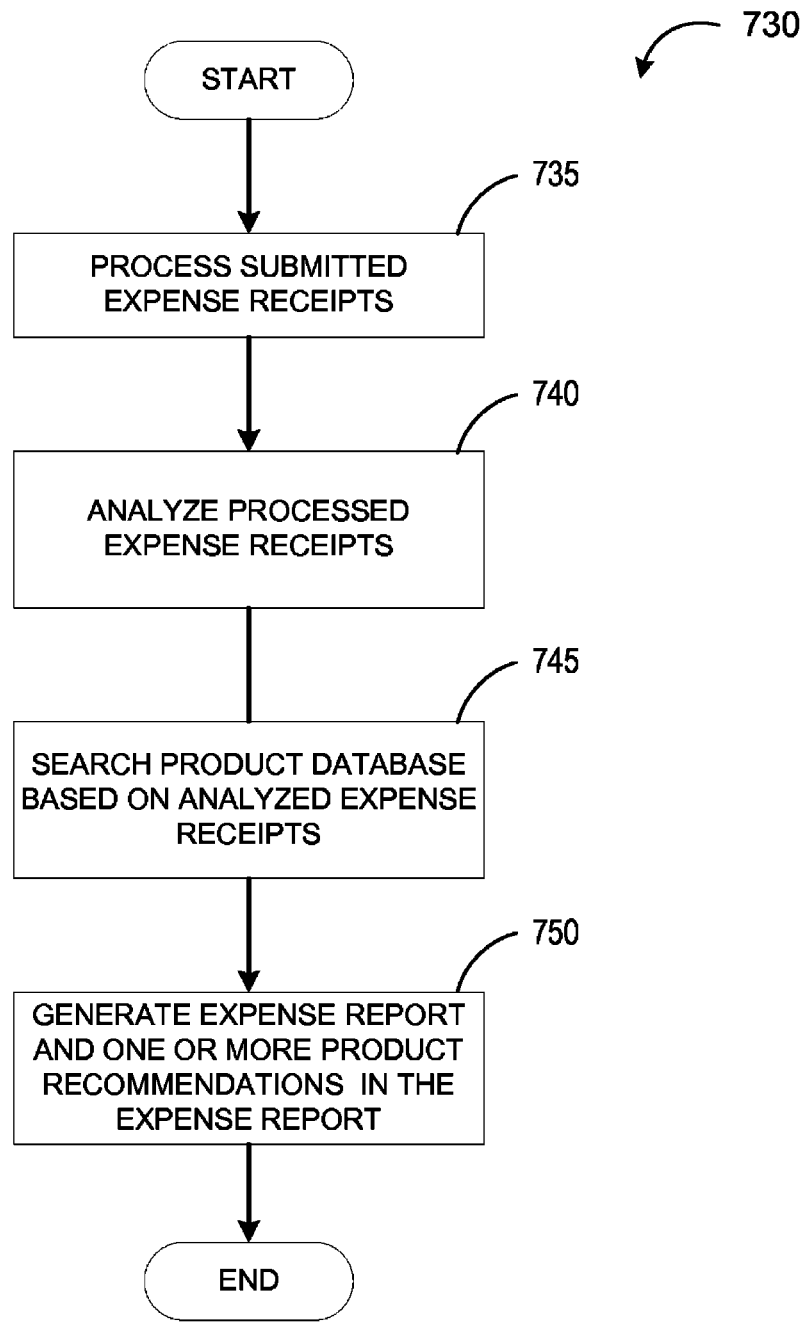
FIG. 7B is a flow diagram illustrating a method of using an expense processing system, according to another embodiment.

FIG. 7B is a flow diagram illustrating a method of using an expense processing system, according to another embodiment. The method 730 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 730 is performed by an expense processing system as described herein of by an external system (e.g., a product recommendation system) which communicates with the expense processing system.

Based on the expense data, a particular product recommendation can be offered to a user. For example, a product recommendation may be placed next to a receipt image in an expense report, an expense line in a report and/or in a communication with the expense report (such as an email). Product recommendations may be placed in the expense report and/or in the communication with the expense report based on a user's expense profile. In one embodiment, a recommendation engine may select particular attributes that it should target based on future expense, based on past receipts, and/or based on a user's expense profile or role in the company.

Referring to FIG. 7B, the method 730 begins with processing submitted expense receipts (e.g., expense data) at block 735. At block 740, the processed expense receipts (e.g., processed expense data) are analyzed. A product database is searched based on the analyzed expense receipts (block 745). At block 750, an expense report and/or an expense feed is generated and one or more produce recommendations are included in the expense report and/or expense feed.

Figure 7C:
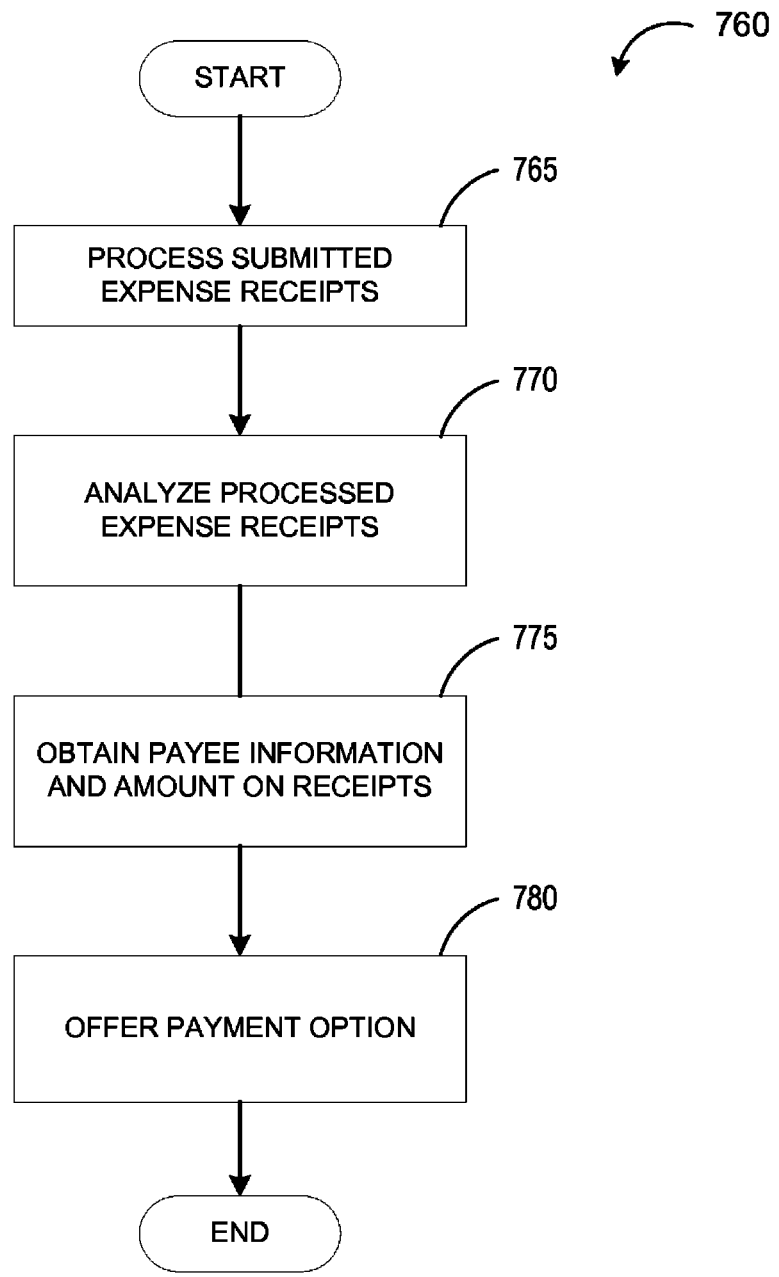
FIG. 7C is a flow diagram illustrating a method of using an expense processing system, according to a further embodiment.

FIG. 7C is a flow diagram illustrating a method of using an expense processing system, according to a further embodiment. The method 760 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 760 is performed by an expense processing system as described herein of by an external system which communicates with the expense processing system.

In one embodiment, an expense receipt may not have been paid by the user (e.g., the receipt is an invoice listing one or more charges, rather than a receipt for payment). Based on the data in an expense, the expense processing system as described herein may trigger a payment. For example, when the user takes a picture of a particular receipt, one or more module on the computing system could offer to pay that receipt. The expense processing system may look up the payee and all the required information to complete the transaction based on receipt and/or other inputs provided by the user. The expense processing system may then initiate the payment transaction through a payment or transaction network. The payee can receive a confirmation that the transaction was triggered or payment was received.

Referring to FIG. 7C, the method 760 begins with processing submitted expense receipts (e.g., expense data) at block 765. At block 770, the processed expense receipts (e.g., processed expense data) are analyzed. The payee information (e.g., payee name, address, account numbers, payment information) and the amounts on the expense receipts are obtained (block 775). At block 780, a payment option is offered to the user (e.g., pay by cash, credit card, debit card, wire transfer, etc.).

In another embodiment (not shown in the figures), the expense processing system described herein may be used in conjunction with a system which allows for the calculation and processing of mileage expenses. For example, a user may take an image of a note or receipt that contains the number of miles or kilometers driven, the location (e.g. the starting location, destination or a trip description), and/or the date can be interpreted as an expense. If a trip is on the same day the image is taken expense processing system may assign the date of the image to the mileage expense and include the mileage expense in an expense report. A user may provide the distance traveled in kilometers, miles, and/or other units of measurement. The expense processing system may automatically convert the distance provided by the user into a different unit used in an expense report or for a particular account or user. Mileage reimbursement rates may be set to specific rates based on a user's account/profile, based on a corporate account/profile, and/or other settings. The expense report may summarize a trip in miles or kilometers, based on a user's preference.

Figure 8:
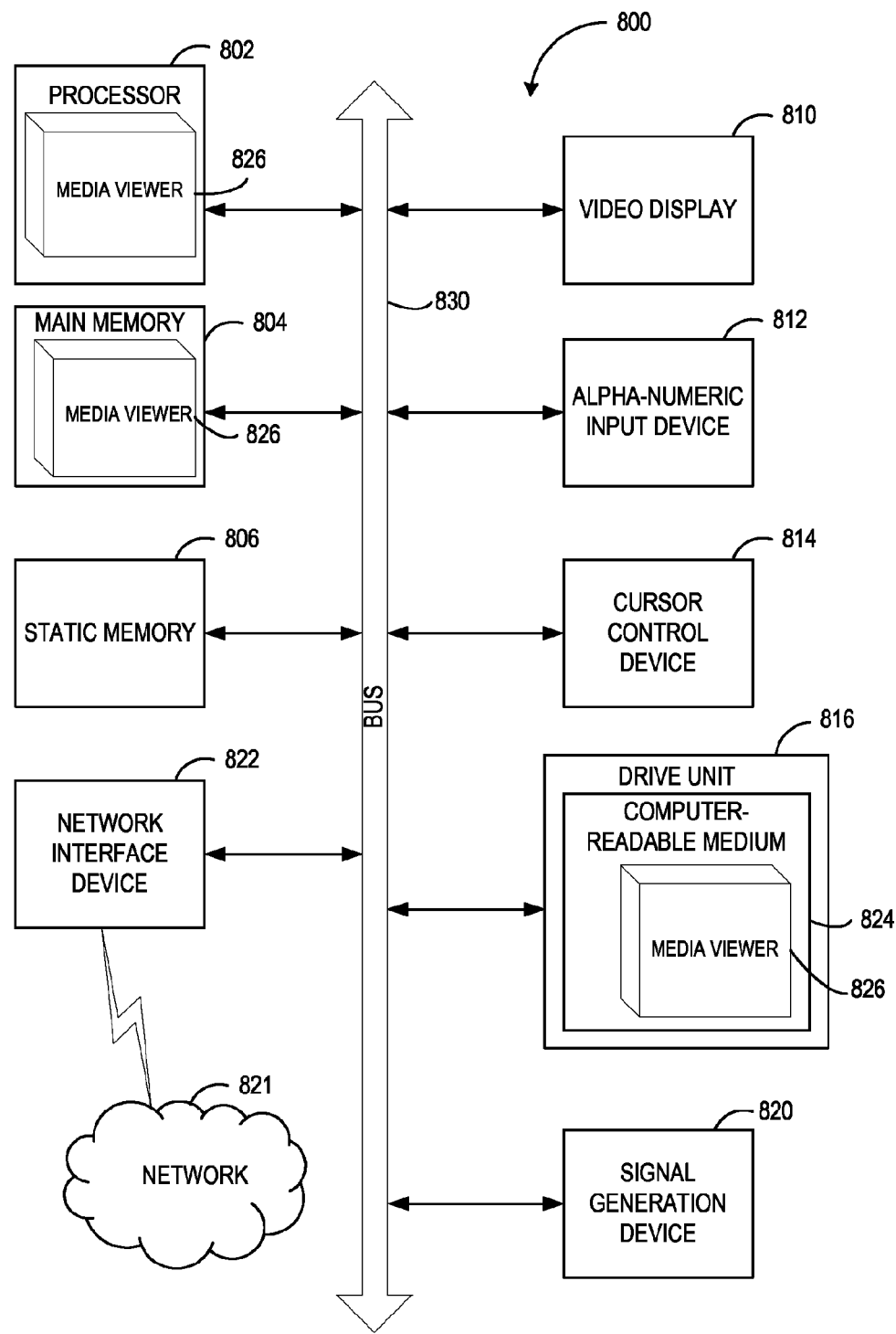
FIG. 8 illustrates a diagrammatic representation of a machine in the exemplary form of a computer system, in accordance with one embodiment.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a secondary memory 816 (e.g., a data storage device), which communicate with each other via a bus 830.

The processor 802 represents one or more general-purpose processing devices such as a microprocessor, central processing unit, or the like. More particularly, the processor 802 may be a complex instruction set computing (CISC) microprocessor, reduced instruction set computing (RISC)

microprocessor, very long instruction word (VLIW) microprocessor, processor implementing other instruction sets, or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 is configured to execute one or more of the modules of the expense processing system for performing the operations and steps discussed herein.

The computer system 800 may further include a network interface device 822. The network interface device may be in communication with a network 821. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The secondary memory 816 may include a computer-readable storage medium (or more specifically a computer-readable storage medium) 824 on which is stored one or more sets of instructions for authentication tool 200 embodying any one or more of the methodologies or functions described herein. The instructions of the authentication tool 200 may also reside, completely or at least partially, within the main memory 804 and/or within the processing device 802 during execution thereof by the computer system 800, the main memory 804 and the processing device 802 also constituting computer-readable storage media. The instructions of the authentication tool 200 may further be transmitted or received over a network via the network interface device 822.

While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine that cause the machine to perform any one or more of the methodologies of the present invention. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "processing," "storing," "generating," "obtaining," "providing," "performing," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method comprising:
  receiving, by a server, images of expense receipts from a user device;
  processing, by the server, the images of expense receipts to recognize receipt information;
  receiving, by the server, contextual data automatically from the user device, wherein the contextual data comprises sensor information captured by the user device when an image of an expense receipt of the expense receipts is obtained, the sensor information comprising GPS coordinates;
  overriding the contextual data or the recognized receipt information in response to detecting a mismatch between the recognized receipt information and the contextual data;

identifying, by the server based on the contextual data, a vendor associated with the expense receipt and a display format for an expense report;

automatically generating, by the server, a list of user expenses based on the receipt information and the contextual data, wherein the list of user expenses comprises the vendor; and generating an expense feed using the list of user expenses and providing the expense feed to an external system, wherein the external system uses the expense feed to automatically generate an expense report using the display format and the list of user expenses.

2. The method of claim 1, further comprising:
processing the contextual data to obtain a phone number from a first image of the images of expense receipts; and
identifying one or more of a name, a vendor location, or a vendor category based on the contextual data.

3. The method of claim 2, further comprising:
providing a user interface facilitating user review of one or more user expenses in the list of user expenses and user modification of the one or more user expenses.

4. The method of claim 1, wherein processing the images of expense receipts comprises:
obtaining text from the images of expense receipts; and
processing the text using one or more grammars to obtain the receipt information.

5. The method of claim 4, wherein the text is further processed using one or more databases to obtain the receipt information.

6. The method of claim 1, wherein the expense report is generated based on a pre-defined template, wherein the pre-defined template is customized by a user.

7. The method of claim 1, wherein each user expense in the list of user expenses is associated with a category.

8. The method of claim 1, wherein providing the expense feed to the external system comprises providing the expense feed in a Really Simple Syndication (RSS) format.

9. A system comprising:
a memory configured to store images of expense receipts;
a processing device couple to the memory and configured to:
receive the images of the expense receipts from a user device;
process the images of expense receipts to recognize receipt information;
receive contextual data automatically from the user device, wherein the contextual data comprises sensor information captured by the user device when an image of an expense receipt of the expense receipts is obtained, the sensor information comprising GPS coordinates;
override the contextual data or the recognized receipt information in response to detecting a mismatch between the recognized receipt information and the contextual data;
identify, by the server based on the contextual data, a vendor associated with the expense receipt and a display format for an expense report;
automatically generate a list of user expenses based on the receipt information and the contextual data, wherein the list of user expenses comprises the vendor; and
generate an expense feed using the list of user expenses and providing the expense feed to an external system, wherein the external system uses the expense feed to automatically generate an expense report using the list of user expenses and the display format.

10. The system of claim 9, wherein the processing device is further configured to:
process the contextual data to obtain a phone number from a first image of the images of expense receipts; and
identify one or more of a name, a vendor location, or a vendor category based on the contextual data.

11. The system of claim 10, wherein the processing device is further configured to:
provide a user interface facilitating user review of one or more user expenses in the list of user expenses and user modification of the one or more user expenses.

12. The system of claim 9, wherein processing the images of expense receipts comprises:
obtaining text from the images of expense receipts; and
processing the text using one or more grammars to obtain the receipt information.

13. The system of claim 12, wherein the text is further processed using one or more databases to obtain the receipt information.

14. The system of claim 9, wherein the expense report is generated based on a pre-defined template, wherein the pre-defined template is customized by a user.

15. The system of claim 9, wherein each user expense in the list of user expenses is associated with a category.

16. The method of claim 9, wherein to providing the expense feed to the external system comprises providing the expense feed in a Really Simple Syndication (RSS) format.

17. A non-transitory machine-readable storage medium including data that, when accessed by a processing device, cause the processing device to perform a method comprising:
receiving, by the processing device, images of expense receipts from a user device;
processing, by the processing device, the images of expense receipts to obtain recognize receipt information;
receiving, by the processing device, contextual data automatically from the user device, wherein the contextual data comprises sensor information captured by the user device when an image of an expense receipt of the expense receipts is obtained, the sensor information comprising GPS coordinates;
overriding the contextual data or the recognized receipt information in response to detecting a mismatch between the recognized receipt information and the contextual data;
identifying, by the server based on the contextual data, a vendor associated with the expense receipt and a format for an expense report;
automatically generating, by the processing device, a list of user expenses based on the receipt information and the contextual data, wherein the list of user expenses comprises the vendor; and
generating an expense feed using the list of user expenses and providing the expense feed to an external system, wherein the external system uses the expense feed to automatically generate an expense report using the display format and the list of user expenses.

18. The non-transitory machine-readable storage medium of claim 17, wherein the method further comprises:
processing the contextual data to obtain a phone number from a first image of the images of expense receipts; and identifying one or more of a name, a vendor location, or a vendor category based on the contextual data.

19. The non-transitory machine-readable storage medium of claim 18, wherein the method further comprises:
providing a user interface facilitating user review of one or more user expenses in the list of user expenses and user modification of the one or more user expenses.

20. The non-transitory machine-readable storage medium of claim 17, wherein processing the images of expense receipts comprises:
obtaining text from the images of expense receipts; and
processing the text using one or more grammars to obtain the receipt information.

21. The non-transitory machine-readable storage medium of claim 20, wherein the text is further processed using one or more databases to obtain the receipt information.

22. The non-transitory machine-readable storage medium of claim 17, wherein the expense report is generated based on a pre-defined template, wherein the pre-defined template is customized by a user.

23. The non-transitory machine-readable storage medium of claim 17, wherein each user expense in the list of user expenses is associated with a category.

24. The method of claim 17, wherein providing the expense feed to the external system comprises providing the expense feed in a Really Simple Syndication (RSS) format.

* * * * *